United States Patent
Zhang et al.

(10) Patent No.: US 11,787,935 B2
(45) Date of Patent: Oct. 17, 2023

(54) FILLER, PREPARATION METHOD THEREOF, RESIN COMPOSITION COMPRISING THE FILLER AND ARTICLE MADE THEREFROM

(71) Applicant: Elite Electronic Material (KunShan) Co., Ltd., Kunshan (CN)

(72) Inventors: Yan Zhang, Kunshan (CN); Rongtao Wang, Kunshan (CN); Ningning Jia, Kunshan (CN)

(73) Assignee: ELITE ELECTRONIC MATERIAL (KUNSHAN) CO., LTD., Kunshan (CN)

( * ) Notice: Subject to any disclaimer, the term of this patent is extended or adjusted under 35 U.S.C. 154(b) by 3 days.

(21) Appl. No.: 17/557,893

(22) Filed: Dec. 21, 2021

(65) Prior Publication Data

US 2023/0151212 A1 May 18, 2023

(30) Foreign Application Priority Data

Nov. 18, 2021 (CN) .......................... 202111371840.5

(51) Int. Cl.
*C08L 71/12* (2006.01)
*C08K 3/40* (2006.01)
*C08K 3/36* (2006.01)
*C08K 7/22* (2006.01)

(52) U.S. Cl.
CPC ................ *C08L 71/12* (2013.01); *C08K 3/36* (2013.01); *C08K 3/40* (2013.01); *C08K 7/22* (2013.01)

(58) Field of Classification Search
CPC .. C08L 71/12; C08K 3/36; C08K 3/40; C08K 7/22
USPC .......................................................... 525/390
See application file for complete search history.

(56) References Cited

U.S. PATENT DOCUMENTS

| | | | | |
|---|---|---|---|---|
| 2016/0137900 A1* | 5/2016 | Lin | ..................... | C08G 18/4277 252/76 |
| 2019/0367727 A1* | 12/2019 | Liu | ....................... | H05K 1/0373 |
| 2020/0291228 A1* | 9/2020 | Liao | ........................ | C08J 5/244 |

FOREIGN PATENT DOCUMENTS

JP 2019177688 A * 10/2019 ............... B32B 9/00

OTHER PUBLICATIONS

Fujiwara et al., JP 2019-177688 A machine translation in English, Oct. 17, 2019 (Year: 2019).*

* cited by examiner

*Primary Examiner* — David T Karst
(74) *Attorney, Agent, or Firm* — Muncy, Geissler, Olds & Lowe, P.C.

(57) ABSTRACT

A filler includes a first precursor and a second precursor; the first precursor is a hollow filler with a surface covered by a first silane coupling agent; the second precursor is a non-hollow filler with a surface covered by a second silane coupling agent; the first precursor and the second precursor are connected by a covalent bond formed by a chemical reaction between the first silane coupling agent and the second silane coupling agent. Also included are a preparation method of the filler and a resin composition containing the filler. A prepreg, a resin film, a laminate, or a printed circuit board made from the resin composition has excellent thermal resistance after moisture absorption, low Df variation rate under moisture and heat, low water absorption rate, high copper foil peeling strength, the prepreg having a smooth appearance and even color, and absence of branch-like pattern on laminate.

19 Claims, 2 Drawing Sheets

FILLER, PREPARATION METHOD THEREOF, RESIN COMPOSITION COMPRISING THE FILLER AND ARTICLE MADE THEREFROM

CROSS-REFERENCE TO RELATED APPLICATION

This application claims the priority benefits of China Patent Application No. 202111371840.5, filed on Nov. 18, 2021. The entirety the above-mentioned patent application is hereby incorporated by reference herein and made a part of this specification.

BACKGROUND

1. Field of the Disclosure

The present disclosure pertains to the field of high frequency communication materials and more particularly to a resin composition useful for preparing an article such as a prepreg, a resin film, a laminate or a printed circuit board, a filler useful for the resin composition and a method of preparing the filler.

2. Description of Related Art

With the advent of the 5G generation, technology upgrade of printed circuit boards for mobile communication requires the fundamental insulation materials in printed circuit boards to achieve not only good dielectric properties but also high copper foil peeling strength, low water absorption rate, high thermal resistance after moisture absorption and excellent dielectric stability, so as to meet the demands of printed circuit boards used under severe conditions. Conventionally, to achieve desirable dielectric properties, polyphenylene ether or polyolefin was used as the main component and triallyl isocyanurate (TAIC) was used as the auxiliary cross-linking component in conjunction with a large amount of spherical silica fillers, and laminates thus obtained achieved better dielectric properties, but these materials failed to meet the growing demands in high copper foil peeling strength, low water absorption rate, high thermal resistance after moisture absorption and excellent dielectric stability. Accordingly, there is an urgent need in the present technical field to develop a novel filler having high copper foil peeling strength, low water absorption rate, high thermal resistance after moisture absorption and excellent dielectric stability.

SUMMARY

To address the problems above, in one aspect, the present disclosure provides a filler comprising a first precursor and a second precursor, wherein the first precursor is a hollow filler with a surface covered by a first silane coupling agent; the second precursor is a non-hollow filler with a surface covered by a second silane coupling agent; and the first precursor and the second precursor are connected by a covalent bond formed by a chemical reaction between the first silane coupling agent and the second silane coupling agent.

Optionally, the hollow filler and the non-hollow filler are independently made of organic component, inorganic component or a combination thereof. The organic component comprises, but not limited to, polytetrafluoroethylene, polyphenylene sulfide, polyetherimide, polyphenylene ether, polyethersulfone, silicone or a combination thereof; the inorganic component comprises, but not limited to, glass, silica, sodium oxide, calcium oxide, boron trioxide, aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, zinc molybdate-modified talc, zinc oxide, zirconium oxide, mica, boehmite, calcined talc, talc, silicon nitride, calcined kaolin, or a combination thereof.

Furthermore, the hollow filler has a maximum particle size of less than or equal to 100 μm, and the non-hollow filler has a maximum particle size of less than or equal to 15 μm.

Optionally, the first silane coupling agent and the second silane coupling agent are independently a C=C double bond-containing, an epoxy-containing, a mercapto-containing or an amino-containing silane coupling agent or a combination thereof.

Furthermore, the amount of the first silane coupling agent is 0.5% to 5% by weight of the hollow filler, and the amount of the second silane coupling agent is 0.5% to 5% by weight of the non-hollow filler.

Furthermore, a weight ratio of the first precursor to the second precursor is from 3:97 to 30:70.

In another aspect, the present disclosure provides a method of preparing the aforesaid filler, comprising the following steps:

preparing the first precursor: stirring the hollow filler in an alkaline solution to obtain a surface-hydroxylated hollow filler; stirring the surface-hydroxylated hollow filler and the first silane coupling agent in a first solvent to obtain the first precursor, the first precursor being the hollow filler with a surface covered by the first silane coupling agent;

preparing the second precursor: stirring the non-hollow filler in the alkaline solution to obtain a surface-hydroxylated non-hollow filler; stirring the surface-hydroxylated non-hollow filler and the second silane coupling agent in the first solvent to obtain the second precursor, the second precursor being the non-hollow filler with a surface covered by the second silane coupling agent; chemically connecting the first precursor and the second precursor: well mixing the first precursor and the second precursor in a second solvent and, in the presence of a first curing accelerator, subjecting the first precursor and the second precursor to the chemical reaction via the first silane coupling agent and the second silane coupling agent so as to form the covalent bond therebetween to obtain the filler.

Optionally, the first silane coupling agent and the second silane coupling agent are independently a C=C double bond-containing, an epoxy-containing, a mercapto-containing or an amino-containing silane coupling agent or a combination thereof.

Optionally, the alkaline solution comprises, but not limited to, a sodium hydroxide solution, a potassium hydroxide solution, triethylamine or potassium tert-butoxide.

Optionally, the first solvent comprises, but not limited to, water, methanol, ethanol, ethylene glycol monomethyl ether, acetone, butanone, methyl isobutyl ketone, cyclohexanone, toluene, xylene, methoxyethyl acetate, ethoxyethyl acetate, propoxyethyl acetate, ethyl acetate, propylene glycol methyl ether, dimethyl formamide, dimethyl acetamide, N-methyl-pyrrolidone, or a mixture thereof.

Optionally, the second solvent comprises, but not limited to, methanol, ethanol, ethylene glycol monomethyl ether, acetone, butanone, methyl isobutyl ketone, cyclohexanone, toluene, xylene, methoxyethyl acetate, ethoxyethyl acetate, propoxyethyl acetate, ethyl acetate, propylene glycol methyl ether, dimethyl formamide, dimethyl acetamide, N-methylpyrrolidone, or a mixture thereof.

Optionally, the first curing accelerator comprises, but not limited to, a Lewis base, a curing initiator or a combination thereof.

Furthermore, the step of preparing the first precursor and the step of preparing the second precursor are performed at a temperature of 20° C. to 60° C. respectively and with 1 to 8 hours of stirring respectively.

Furthermore, the step of chemically connecting the first precursor and the second precursor is performed at a temperature of 60° C. to 120° C. and with 1 to 6 hours of the chemical reaction.

Furthermore, in the step of chemically connecting the first precursor and the second precursor, a weight ratio of the first precursor to the second precursor is controlled to be from 3:97 to 30:70.

In still another aspect, the present disclosure also provides a resin composition, which comprises:
(A) an unsaturated C=C double bond-containing polyphenylene ether resin;
(B) an unsaturated C=C double bond-containing crosslinking agent; and
(C) the filler according to the present disclosure.

Optionally, the unsaturated C=C double bond-containing polyphenylene ether resin comprises a vinylbenzyl polyphenylene ether resin, a (meth)acryloyl polyphenylene ether resin, a vinyl polyphenylene ether resin or a combination thereof.

Optionally, the unsaturated C=C double bond-containing crosslinking agent comprises, but not limited to, bis(vinylphenyl)ethane, bis(vinylbenzyl)ether, divinylbenzene, divinylnaphthalene, divinylbiphenyl, t-butyl styrene, triallyl isocyanurate, triallyl cyanurate, 1,2,4-trivinyl cyclohexane, diallyl bisphenol A, styrene, butadiene, decadiene, octadiene, vinylcarbazole, acrylate or a combination thereof.

Furthermore, the resin composition comprises 5 parts by weight to 40 parts by weight of the unsaturated C=C double bond-containing crosslinking agent and 50 parts by weight to 130 parts by weight of the filler based on 100 parts by weight of the unsaturated C=C double bond-containing polyphenylene ether resin.

Furthermore, the resin composition further comprises, based on 100 parts by weight of the unsaturated C=C double bond-containing polyphenylene ether resin, 13 parts by weight to 35 parts by weight of a polyolefin. The polyolefin comprises, but not limited to, polybutadiene, polyisoprene, styrene-butadiene copolymer, styrene-isoprene copolymer, styrene-butadiene-divinylbenzene terpolymer, styrene-butadiene-maleic anhydride terpolymer, vinyl-polybutadiene-urethane oligomer, maleic anhydride-butadiene copolymer, polymethylstyrene, hydrogenated polybutadiene, hydrogenated styrene-butadiene-divinylbenzene terpolymer, hydrogenated styrene-butadiene-maleic anhydride terpolymer, hydrogenated styrene-butadiene copolymer, hydrogenated styrene-isoprene copolymer or a combination thereof.

Moreover, the resin composition further comprises maleimide resin, benzoxazine resin, epoxy resin, organic silicone resin, cyanate ester resin, active ester, phenolic resin, styrene maleic anhydride, amine curing agent, polyamide, polyimide or a combination thereof.

Moreover, the resin composition further comprises a flame retardant, a second curing accelerator, a polymerization inhibitor, a third solvent, a third silane coupling agent, a surfactant, a coloring agent, a toughening agent or a combination thereof.

In still another aspect, the present disclosure provides an article made from the resin composition described above, which comprises a prepreg, a resin film, a laminate or a printed circuit board.

Articles made from the resin composition disclosed herein have one, more or all of the following properties:
the prepreg having a smooth appearance and even color under visual inspection; the article having a copper foil peeling strength as measured by reference to IPC-TM-650 2.4.8 of greater than or equal to 3.8 lb/inch;
no delamination occurs after subjecting the article to a thermal resistance after moisture absorption test by reference to IPC-TM-650 2.6.16.1 and IPC-TM-650 2.4.23;
the article having a water absorption rate as measured by reference to IPC-TM-650 2.6.2.1 of less than or equal to 0.30%;
the article having a dissipation factor variation rate under moisture and heat of less than or equal to 40% as calculated according to a dissipation factor measured at room temperature and a dissipation factor measured after the article is placed under a temperature of 85° C. and a relative humidity of 85% for 48 hours, both being measured by reference to JIS C2565 at 10 GHz; and
the article being without branch-like pattern under visual inspection.

DESCRIPTION OF THE EMBODIMENTS

Figure 1:
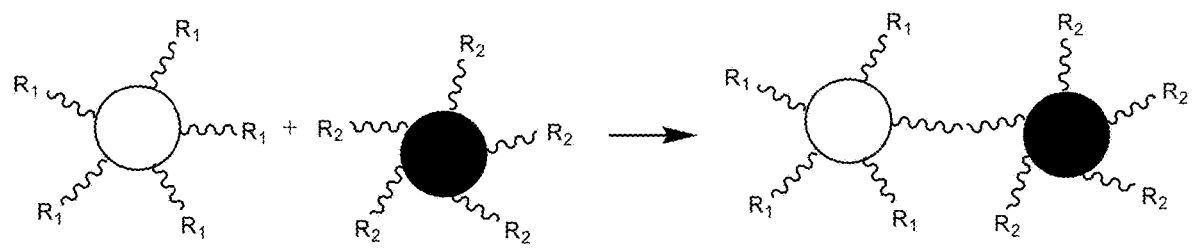
FIG. 1 illustrates the process of chemically connecting the first precursor and the second precursor.

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described regardless of whether they are right or wrong, as long as the embodiments can be implemented according to the present disclosure.

As used herein, "the present disclosure" means "the present invention".

As used herein, "a," "an" or any similar expression is employed to describe components and features of the present disclosure. This is done merely for convenience and to give a general sense of the scope of the present disclosure. Accordingly, this description should be read to include one or at least one and the singular also includes the plural unless it is obvious to mean otherwise.

As used herein, "or a combination thereof" means "or any combination thereof", and "any" means "any one", vice versa.

As used herein, the term "encompasses," "encompassing," "comprises," "comprising," "includes," "including," "has," "having" or any other variant thereof is construed as an open-ended transitional phrase intended to cover a non-exclusive inclusion. For example, a composition or manufacture that comprises a list of elements is not necessarily limited to only those elements but may include other elements not expressly listed or inherent to such composition or manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "encompasses," "encompassing," "comprises," "comprising," "includes," "including," "has," "having" or any other variant thereof, it is understood that close-ended transitional phrases such as "consisting of," "composed by" and "remainder being" and partially open-ended transitional phrases such as "consisting essentially of," "primarily consisting of," "mainly consisting of," "primarily containing," "composed essentially of," "essentially having," etc. are also disclosed and included.

In this disclosure, features and conditions such as values, numbers, contents, amounts or concentrations are presented as a numerical range or a percentage range merely for convenience and brevity. Therefore, a numerical range or a percentage range should be interpreted as encompassing and specifically disclosing all possible subranges and individual numerals or values therein, including integers and fractions, particularly all integers therein. For example, a range of "1.0 to 8.0" or "between 1.0 and 8.0" should be understood as explicitly disclosing all subranges such as 1.0 to 8.0, 1.0 to 7.0, 2.0 to 8.0, 2.0 to 6.0, 3.0 to 6.0, 4.0 to 8.0, 3.0 to 8.0 and so on and encompassing the endpoint values, particularly subranges defined by integers, as well as disclosing all individual values in the range such as 1.0, 2.0, 3.0, 4.0, 5.0, 6.0, 7.0 and 8.0. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$," and Y is described as being "selected from a group consisting of $Y_1$, $Y_2$ and $Y_3$," the disclosure encompasses any combination of X is $X_1$ and/or $X_2$ and/or $X_3$ and Y is $Y_1$ and/or $Y_2$ and/or $Y_3$.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property.

Unless otherwise specified, a chemical reaction refers to the process in which molecules are broken into atoms and atoms are rearranged to form new molecules.

Unless otherwise specified, according to the present disclosure, a polymer refers to the product formed by monomer(s) via polymerization and usually comprises multiple aggregates of polymers respectively formed by multiple repeated simple structure units by covalent bonds; the monomer refers to the compound forming the polymer. A polymer may comprise a homopolymer, a copolymer, a prepolymer, etc., but not limited thereto. A homopolymer refers to the polymer formed by the polymerization of one monomer. Copolymers comprise: random copolymers, such as a structure of -AABABBBAAABBA-; alternating copolymers, such as a structure of -ABABABAB-; graft copolymers, such as a structure of -AA(A-BBBB)AA(A-BBBB)AAA-; and block copolymers, such as a structure of -AAAAA-BBBBBB-AAAAA-. For example, a styrene-butadiene copolymer disclosed herein is interpreted as comprising a styrene-butadiene random copolymer, a styrene-butadiene alternating copolymer, a styrene-butadiene graft copolymer or a styrene-butadiene block copolymer. A prepolymer refers to a polymer having a lower molecular weight between the molecular weight of monomer and the molecular weight of final polymer, and a prepolymer contains a reactive functional group capable of participating further polymerization to obtain the final polymer product which has been fully crosslinked or cured. The term "polymer" includes but is not limited to an oligomer. An oligomer refers to a polymer with 2-20, typically 2-5, repeating units.

Unless otherwise specified, the term "resin" of the present disclosure is a widely used common name of a synthetic polymer and is construed as comprising monomer and its combination, polymer and its combination or a combination of monomer and its polymer, but not limited thereto.

Unless otherwise specified, according to the present disclosure, a modification comprises a product derived from a resin with its reactive functional group modified, a product derived from a prepolymerization reaction of a resin and other resins, a product derived from a crosslinking reaction of a resin and other resins, a product derived from copolymerizing a resin and other resins, etc.

The unsaturated bond described herein, unless otherwise specified, refers to a reactive unsaturated bond, such as but not limited to an unsaturated double bond with the potential of being crosslinked with other functional groups, such as an unsaturated C=C double bond with the potential of being crosslinked with other functional groups, but not limited thereto.

The unsaturated C=C double bond as used herein preferably comprises, but not limited to, a vinyl group, a vinylbenzyl group, a (meth)acryloyl group, an allyl group or a combination thereof. The term "vinyl group" is construed as comprising a vinyl group and a vinylene group. The term "(meth)acryloyl group" is construed as comprising an acryloyl group and a methacryloyl group.

Unless otherwise specified, an alkyl group and an alkenyl group described herein are construed to encompass various isomers thereof. For example, a propyl group is construed to encompass n-propyl and iso-propyl.

As used herein, the maximum particle size D100 refers to the particle size of a filler sample when the cumulative volume percentage reaches 100%, which has a physical meaning that 100% of filler particles have a particle size of less than or equal to the particle size.

Unless otherwise specified, as used herein, part(s) by weight represents weight part(s) in any weight unit in the resin composition, such as but not limited to kilogram, gram, pound and so on. For example, 100 parts by weight of an unsaturated C=C double bond-containing polyphenylene ether resin may represent 100 kilograms of the unsaturated C=C double bond-containing polyphenylene ether resin or 100 pounds of the unsaturated C=C double bond-containing polyphenylene ether resin.

It should be understood that all features disclosed herein may be combined in any way to constitute the technical solution of the present disclosure, as long as there is no conflict present in the combination of these features.

Examples and embodiments are described in detail below. It will be understood that these examples and embodiments are exemplary only and are not intended to limit the scope and use of the present disclosure. Unless otherwise specified, processes, reagents and conditions described in the examples are those known in the art.

In one aspect, the present disclosure provides a filler comprising a first precursor and a second precursor, wherein the first precursor is a hollow filler with a surface covered by a first silane coupling agent; the second precursor is a non-hollow filler with a surface covered by a second silane coupling agent; and the first precursor and the second precursor are connected by a covalent bond formed by a chemical reaction between the first silane coupling agent and the second silane coupling agent on their respective surfaces.

The type of the chemical reaction is not particularly limited and may comprise, but not limited to, various organic chemical reactions, preferably an addition reaction or a substitution reaction. More preferable is an addition reaction of an amino group, an addition reaction of a mercapto group or a ring-opening substitution reaction of an epoxy group.

The shape of the hollow filler and the non-hollow filler is not particularly limited and may be such as but not limited to spherical, fibrous or particulate. Preferably, the hollow filler and the non-hollow filler are both spherical in shape.

The chemical composition of the hollow filler and the non-hollow filler is not particularly limited and may include any one or more organic components or inorganic components suitable for making a prepreg, a resin film, a laminate, or a printed circuit board, and the hollow filler and the non-hollow filler may have the same or different chemical composition. For example, the organic component may comprise, but not limited to, polytetrafluoroethylene, polyphenylene sulfide, polyetherimide, polyphenylene ether, polyethersulfone, silicone or a combination thereof. In one embodiment, for example, the inorganic component comprises, but not limited to, glass, silica (fused or non-fused), sodium oxide, calcium oxide, boron trioxide, aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, zinc molybdate-modified talc, zinc oxide, zirconium oxide, mica, boehmite, calcined talc, talc, silicon nitride, calcined kaolin, or a combination thereof. As used herein, glass is an inorganic component widely used in the field of the present disclosure which is composed of multiple oxides, mainly comprising silica and optionally comprising aluminum oxide, sodium oxide, calcium oxide, boron trioxide, etc. Examples include, but not limited to, hollow glass iM30K available from 3M, which comprises 70-80 wt % of silica, 3-8 wt % of sodium oxide, 8-15 wt % of calcium oxide and 2-6 wt % of boron trioxide. Preferably, the hollow filler is hollow silica, hollow glass, hollow silicone or a combination thereof. Preferably, the non-hollow filler is silica or glass.

For example, examples of hollow filler suitable for the present disclosure include, but not limited to, iM30K, iM16K, S32HS, S38HS or S60HS available from 3M, Ecosphere SID 200Z or Ecosphere SID 311Z available from Trelleborg Emerson & Cuming, Inc., BIONIC BUBBLE™ XL-150® or VEA X-10 available from Sphere Services, Inc., FILLITER® 106 or FILLITER® 160 W available from Trelleborg Fillite, E-SPHERES SL-75 available from Envirospheres Pty. Ltd., S1, S15, S20, S25, S32, S38, G38HS, G32HS, G15 or G22 available from SiLi Glass Beads Co., Ltd, and SBN04 or KBN06 available from Shima Trading Company.

The maximum particle size of the hollow filler and the non-hollow filler is not particularly limited. Preferably, the hollow filler has a maximum particle size of less than or equal to 100 µm; more preferably, the hollow filler has a maximum particle size of less than or equal to 50 µm. Preferably, the non-hollow filler has a maximum particle size of less than or equal to 15 µm; more preferably, the non-hollow filler has a maximum particle size of less than or equal to 7 µm.

The type of the first silane coupling agent and the second silane coupling agent is not particularly limited as long as the first silane coupling agent and the second silane coupling agent can induce the chemical reaction. Preferably, the first silane coupling agent comprises, but not limited to, a C=C double bond-containing, an epoxy-containing, a mercapto-containing or an amino-containing silane coupling agent or a combination thereof. Preferably, the second silane coupling agent comprises, but not limited to, a C=C double bond-containing, an epoxy-containing, a mercapto-containing or an amino-containing silane coupling agent or a combination thereof.

The C=C double bond-containing, epoxy-containing, mercapto-containing, or amino-containing silane coupling agent of the present disclosure, in addition to the inclusion of C=C double bond, epoxy group, mercapto group or amino group, may optionally contain another functional group, such as but not limited to alkyl group, aryl group, alkaryl group, haloalkyl group, haloaryl group, oxy group or a combination thereof.

Examples of the first silane coupling agent and the second silane coupling agent used herein include, but not limited to, the following products available from Shin Etsu: vinyltrimethoxysilane (product name KBM-1003) and vinyltriethoxysilane (product name KBE-1003) which contain a vinyl group; p-styryltrimethylsilane (product name KBM-1403) which contains styryl group; 3-methacryloxypropyl methyldimethoxysilane (product name KBM-502), 3-methacryloxypropyl trimethoxysilane (product name KBM-503), 3-methacryloxypropyl methyldiethoxysilane (product name KBE-502), and 3-methacryloxypropyl triethoxysilane (product name KBE-503) which contain methacryl group; 3-acryloxypropyl trimethoxysilane (product name KBM-5103) which contains allyl group; 2-(3,4-epoxycyclohexyl) ethyltrimethoxysilane (product name KBM-303), 3-glycidoxypropyl methyldimethoxysilane (product name KBM-402), 3-glycidoxypropyl trimethoxysilane (product name KBM-403), 3-glycidoxypropyl methyldiethoxysilane (product name KBE-402), and 3-glycidoxypropyl triethoxysilane (product name KBE-403) which contain epoxy group; 3-mercaptopropylmethyldimethoxysilane (product name KBM-802) and 3-mercaptopropyltrimethoxysilane (product name KBM-803) which contain mercapto group; N-2-(aminoethyl)-3-aminopropylmethyldimethoxysilane (product name KBM-602), N-2-(aminoethyl)-3-aminopropyltrimethoxysilane (product name KBM-603), 3-aminopropyltrimethoxysilane (product name KBM-903), 3-aminopropyltriethoxysilane (product name KBE-903), partially hydrolyzates of 3-triethoxysilyl-N-(1,3-dimethyl-butylidene) propylamine (product name KBE-9103P), N-phenyl-3-aminopropyltrimethoxysilane (product name KBM-573), and N-(vinylbenzyl)-2-aminoethyl-3-aminopropyltrimethoxysilane hydrochloride (product name KBM-575) which contain amino group. Examples also include Z-6040 or Z-6020 available from Dow Corning, Y-9669 available from Momentive Performance Materials Inc., and A-187 available from Union Carbide.

The amount of the first silane coupling agent is not particularly limited; for example, based on the weight of the hollow filler, the amount of the first silane coupling agent is 0.5% to 5% by weight, preferably 0.5% to 3.5% by weight, of the hollow filler. The amount of the second silane coupling agent is not particularly limited; for example, based on the weight of the non-hollow filler, the amount of the second silane coupling agent is 0.5% to 5% by weight, preferably 0.5% to 2.5% by weight, of the non-hollow filler.

In the filler, the weight ratio of the first precursor to the second precursor is not particularly limited; for example, the weight ratio of the first precursor to the second precursor may be, but not limited to, between 3:97 and 30:70 and preferably between 10:90 and 25:75. For example, the weight ratio of the first precursor to the second precursor may be 3:97, 5:95, 10:90, 15:85, 20:80, 25:95 or 30:70. If too much first precursor is added, the density of the filler will be lowered, causing the filler floating on the varnish and not easily well dispersed in the varnish.

In another aspect, the present disclosure provides a method of preparing the filler above, comprising the following steps:
preparing the first precursor: stirring the hollow filler in an alkaline solution to obtain a surface-hydroxylated hollow filler; stirring the surface-hydroxylated hollow filler and the first silane coupling agent in a first solvent to obtain the first precursor, the first precursor being the hollow filler with a surface covered by the first silane coupling agent;
preparing the second precursor: stirring the non-hollow filler in the alkaline solution to obtain a surface-hydroxylated non-hollow filler; stirring the surface-hydroxylated non-hollow filler and the second silane coupling agent in the first solvent to obtain the second precursor, the second precursor being the non-hollow filler with a surface covered by the second silane coupling agent;
chemically connecting the first precursor and the second precursor: well mixing the first precursor and the second precursor in a second solvent and, in the presence of a first curing accelerator, subjecting the first precursor and the second precursor to the chemical reaction via the first silane coupling agent and the second silane coupling agent covered on their respective surfaces so as to form the covalent bond therebetween to obtain the filler. The preparation process is illustrated in FIG. 1, wherein ~~~~~R1 represents the first silane coupling agent, ~~~~~R2 represents the second silane coupling agent, the hollow filler is in white color and the non-hollow filler is in black color.

In the preparation process above, the step of preparing the first precursor and the step of preparing the second precursor may be performed in any sequence. For example, the first precursor may be prepared first, then the second precursor is prepared, and then the first precursor and the second precursor are chemically connected. For example, the second precursor may be prepared first, then the first precursor is prepared, and then the first precursor and the second precursor are chemically connected. For example, the first precursor and the second precursor may be separately prepared at the same time, and then the first precursor and the second precursor are chemically connected.

The alkaline solution is not particularly limited, examples including, but not limited to, a sodium hydroxide solution, a potassium hydroxide solution, triethylamine or potassium tert-butoxide. Preferably, in the step of preparing the first precursor and the step of preparing the second precursor, the alkaline solution is a sodium hydroxide solution.

In the step of preparing the first precursor and the step of preparing the second precursor, the temperature is respectively controlled in the range of 20° C. to 60° C., and the stirring time is respectively controlled in the range of 1 to 8 hours. Preferably, in the step of preparing the first precursor and the step of preparing the second precursor, the temperature is respectively controlled in the range of 25° C. to 55° C., and the stirring time is respectively controlled in the range of 3 to 5 hours.

The type of the first solvent is not particularly limited, which is primarily used to disperse the filler. For example, the first solvent may comprise, but not limited to, water, methanol, ethanol, ethylene glycol monomethyl ether, acetone, butanone (i.e., methyl ethyl ketone), methyl isobutyl ketone, cyclohexanone, toluene, xylene, methoxyethyl acetate, ethoxyethyl acetate, propoxyethyl acetate, ethyl acetate, propylene glycol methyl ether, dimethyl formamide, dimethyl acetamide, N-methyl-pyrrolidone, or a mixture thereof. Preferably, the first solvent is a mixture of ethanol and water, the volume ratio of ethanol to water being 5-20:1.

The type of the second solvent is not particularly limited. For example, the second solvent may comprise, but not limited to, methanol, ethanol, ethylene glycol monomethyl ether, acetone, butanone (i.e., methyl ethyl ketone), methyl isobutyl ketone, cyclohexanone, toluene, xylene, methoxyethyl acetate, ethoxyethyl acetate, propoxyethyl acetate, ethyl acetate, propylene glycol methyl ether, dimethyl formamide, dimethyl acetamide, N-methyl-pyrrolidone, or a mixture thereof. Preferably, the second solvent is toluene.

The first curing accelerator suitable for the present disclosure is not particularly limited and may comprise a catalyst, such as a Lewis base or a Lewis acid. The Lewis base may comprise imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP) or a combination thereof. The Lewis acid may comprise metal salt compounds, such as those of manganese, iron, cobalt, nickel, copper and zinc, such as zinc octanoate or cobalt octanoate. The first curing accelerator encompasses curing initiator such as a peroxide capable of producing free radicals, and examples of the curing initiator may comprise, but not limited to: dibenzoyl peroxide (BPO), dicumyl peroxide, 2,5-dimethyl-2,5-di(t-butylperoxy)hexane, 2,5-dimethyl-2,5-di(t-butylperoxy)-3-hexyne (25B), di-t-butyl peroxide, di(t-butyl peroxyisopropyl)benzene, di(t-butylperoxy) phthalate, di(t-butylperoxy) isophthalate, t-butyl peroxybenzoate, 2,2-di(t-butylperoxy)butane, 2,2-di(t-butylperoxy)octane, 2,5-dimethyl-2,5-di(benzoylperoxy)hexane, lauroyl peroxide, t-hexyl peroxypivalate, dibutylperoxyisopropylbenzene, bis(4-t-butylcyclohexyl) peroxydicarbonate or a combination thereof. Preferably, the first curing accelerator used in the step of chemically connecting the first precursor and the second precursor is a Lewis base. More preferably, the first curing accelerator used in the step of chemically connecting the first precursor and the second precursor is an imidazole or triphenylphosphine.

In the step of chemically connecting the first precursor and the second precursor, the temperature is controlled in the range of 60° C. to 120° C. and the time of the chemical reaction is controlled in the range of 1 to 6 hours. Preferably, in the step of chemically connecting the first precursor and the second precursor, the temperature is controlled in the range of 85° C. to 105° C. and the time of the chemical reaction is controlled in the range of 1 to 4 hours.

In still another aspect, the present disclosure provides a resin composition, which comprises the aforesaid filler.

For example, the resin composition may comprise:
(A) an unsaturated C=C double bond-containing polyphenylene ether resin;
(B) an unsaturated C=C double bond-containing crosslinking agent; and
(C) filler.

The unsaturated C=C double bond-containing polyphenylene ether resin used in the present disclosure is not particularly limited and may include any one or more unsaturated C=C double bond-containing polyphenylene ether resins useful for making a prepreg, a resin film, a laminate, or a printed circuit board, such as any one or more commercial products, products prepared by the Applicant or a combination thereof.

The unsaturated C=C double bond-containing polyphenylene ether resin of the present disclosure has an unsaturated C=C double bond and a phenylene ether skeleton, wherein the unsaturated C=C double bond is a reactive group which may perform self-polymerization under heat and may also perform free radical polymerization with other components containing an unsaturated bond in the resin composition and finally result in crosslinking and curing. The cured product thereof has high thermal resistance and good dielectric properties. Preferably, the unsaturated C=C double bond-containing polyphenylene ether resin comprises an unsaturated C=C double bond-containing polyphenylene ether resin with 2,6-dimethyl substitution in its phenylene ether skeleton, wherein the methyl groups form steric hindrance to prevent the oxygen atom of the ether group from forming a hydrogen bond or Van der Waals force to absorb moisture, thereby achieving better dielectric properties.

Generally, the unsaturated C=C double bond-containing polyphenylene ether suitable for the present disclosure may have a structure of Formula (1):

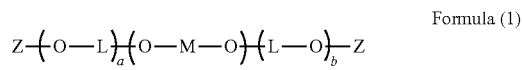

Formula (1)

wherein a and b are individually an integer of 1 to 30, preferably an integer of 1 to 10, and more preferably an integer of 1 to 5;

—(O-M-O)— has a structure of Formula (2) or Formula (3):

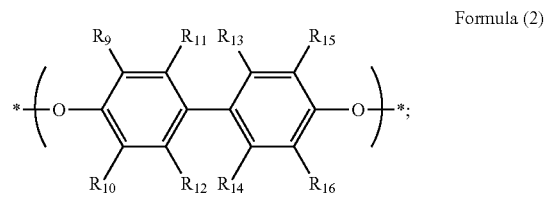

Formula (2)

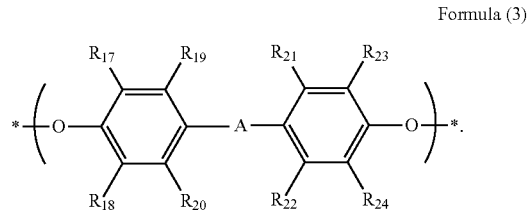

Formula (3)

L has a structure of Formula (4):

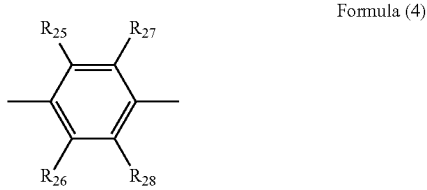

Formula (4)

wherein $R_9$, $R_{10}$, $R_{15}$ and $R_{16}$ are the same or different and are individually a halogen atom, a C1-C6 alkyl group or a phenyl group; $R_1$, $R_{12}$, $R_{13}$ and $R_{14}$ are the same or different and are individually a hydrogen atom, a halogen atom, a C1-C6 alkyl group or a phenyl group; in some embodiments, $R_9$, $R_{10}$, $R_{11}$, $R_{14}$, $R_{15}$ and $R_{16}$ are individually a methyl group, and $R_{12}$ and $R_{13}$ are individually a hydrogen atom;

$R_{17}$, $R_{18}$, $R_{19}$, $R_{20}$, $R_{21}$, $R_{22}$, $R_{23}$ and $R_{24}$ are the same or different and are individually a halogen atom, a C1-C6 alkyl group, a phenyl group or a hydrogen atom; in some embodiments, $R_{17}$, $R_{18}$, $R_{23}$ and $R_{24}$ are individually a methyl group;

A is a C1-C20 straight chain hydrocarbyl group, a C1-C20 branched chain hydrocarbyl group (e.g., branched chain alkyl group) or a C3-C20 cyclic hydrocarbyl group (e.g., cycloalkyl group), preferably —$CH_2$— or —$C(CH_3)_2$—;

$R_{25}$, $R_{26}$, $R_{27}$ and $R_{28}$ are the same or different and are individually a hydrogen atom, a halogen atom, a C1-C6 alkyl group or a phenyl group, preferably individually a hydrogen atom or —CH$_3$;

Z has a structure of Formula (5), Formula (6) or Formula (7):

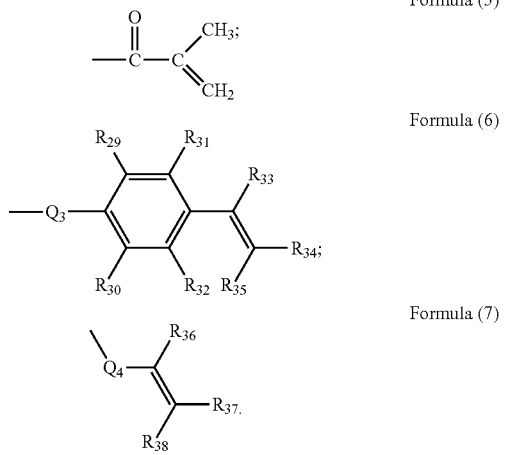

wherein $R_{34}$ and $R_{35}$ represent a hydrogen atom; $R_{29}$, $R_{30}$, $R_{31}$, $R_{32}$ and $R_{33}$ are the same or different, each representing a hydrogen atom, a halogen atom, an alkyl group or a halogen-substituted alkyl group. The alkyl group is preferably a C1-C6 alkyl group, and the halogen-substituted alkyl group is preferably a halogen-substituted C1-C6 alkyl group; $Q_3$ and $Q_4$ are individually an organic group with at least one carbon atom, wherein the organic group optionally comprises one or more of a hydrogen atom, an oxygen atom, a nitrogen atom, a sulfur atom and a halogen atom. In some embodiments, $Q_3$ and $Q_4$ represent a methylene group (—CH$_2$—). In some embodiments, $R_{29}$ to $R_{33}$ are individually a hydrogen atom or a C1-C6 alkyl group.

In some embodiments, the unsaturated C═C double bond-containing polyphenylene ether resin may comprise, but not limited to, a vinylbenzyl polyphenylene ether resin with a number average molecular weight of about 1200 (such as OPE-2st 1200, available from Mitsubishi Gas Chemical Co., Inc.), a vinylbenzyl polyphenylene ether resin with a number average molecular weight of about 2200 (such as OPE-2st 2200, available from Mitsubishi Gas Chemical Co., Inc.), a vinylbenzyl polyphenylene ether resin with a number average molecular weight of about 2400 to 2800 (such as a vinylbenzyl bisphenol A polyphenylene ether resin), a (meth)acryloyl polyphenylene ether resin with a number average molecular weight of about 1900 to 2300 (such as SA9000, available from Sabic), a vinyl polyphenylene ether resin with a number average molecular weight of about 2200 to 3000, or a combination thereof. The vinyl polyphenylene ether resin may include various polyphenylene ether resins disclosed in the US Patent Application Publication No. 20160185904A1, all of which are incorporated herein by reference in their entirety. The vinylbenzyl polyphenylene ether resin may comprise, but not limited to, a vinylbenzyl biphenyl polyphenylene ether resin, a vinylbenzyl bisphenol A polyphenylene ether resin or a combination thereof.

The unsaturated C═C double bond-containing crosslinking agent suitable for the present disclosure is not particularly limited and may comprise, but not limited to, bis(vinylphenyl)ethane, bis(vinylbenzyl)ether, divinylbenzene, divinylnaphthalene, divinylbiphenyl, t-butyl styrene, triallyl isocyanurate, triallyl cyanurate, 1,2,4-trivinyl cyclohexane, diallyl bisphenol A, styrene, butadiene, decadiene, octadiene, vinylcarbazole, acrylate or a combination thereof. These components should be construed as including their isomers or prepolymers.

Unless otherwise specified, relative to a total of 100 parts by weight of (A) the unsaturated C═C double bond-containing polyphenylene ether resin, the amount of (B) the unsaturated C═C double bond-containing crosslinking agent is preferably 5 parts by weight to 40 parts by weight. Insufficient or excessive amount of the unsaturated C═C double bond-containing crosslinking agent fails to achieve an optimal crosslinking density and lowers the glass transition temperature.

Unless otherwise specified, relative to a total of 100 parts by weight of (A) the unsaturated C═C double bond-containing polyphenylene ether resin, the amount of (C) the filler is preferably 50 parts by weight to 130 parts by weight. Insufficient amount of (C) the filler will lower the dimensional stability of the article, and excessive amount of (C) the filler will cause difficulty in the dispersion of the filler in the varnish and result in deteriorated uniformity of different areas of the article.

In addition to (A) the unsaturated C═C double bond-containing polyphenylene ether resin, (B) the unsaturated C═C double bond-containing crosslinking agent and (C) the filler, the resin composition of the present disclosure may further optionally include a polyolefin.

The polyolefin used in the present disclosure is not particularly limited and may include any one or more olefin polymers useful for making a prepreg, a resin film, a laminate, or a printed circuit board, such as any one or more commercial products, products prepared by the Applicant or a combination thereof.

Examples of the polyolefin disclosed herein include but are not limited to a diene polymer, a monoene polymer, a hydrogenated diene polymer or a combination thereof. The diene refers to a hydrocarbon compound containing two unsaturated C═C double bonds in the molecule, and the monoene refers to a hydrocarbon compound containing one unsaturated C═C double bond in the molecule. The number average molecular weight generally ranges from 1000 to 150000. Because the polyolefin has a higher molecular weight and has a main chain containing regularly arranged carbon-carbon bonds, it has low molecular polarity which can improve the dielectric properties of the cured product.

In some embodiments, examples of the polyolefin include but are not limited to: polybutadiene, polyisoprene, styrene-butadiene copolymer, styrene-isoprene copolymer, styrene-butadiene-divinylbenzene terpolymer, styrene-butadiene-maleic anhydride terpolymer, vinyl-polybutadiene-urethane oligomer, maleic anhydride-butadiene copolymer, polymethylstyrene, hydrogenated polybutadiene, hydrogenated styrene-butadiene-divinylbenzene terpolymer, hydrogenated styrene-butadiene-maleic anhydride terpolymer, hydrogenated styrene-butadiene copolymer, hydrogenated styrene-isoprene copolymer or a combination thereof. These components should be construed as including their modifications.

In some embodiments, the polyolefin is preferably a butadiene-based diene polymer, an isoprene-based diene polymer, a hydrogenated butadiene-based diene polymer, a hydrogenated isoprene-based diene polymer or a combination thereof, examples including but not limited to: polybutadiene, hydrogenated polybutadiene, polyisoprene, styrene-butadiene copolymer, hydrogenated styrene-butadiene copolymer, styrene-isoprene copolymer, hydrogenated styrene-isoprene copolymer, styrene-butadiene-divinylbenzene terpolymer, styrene-butadiene-maleic anhydride terpolymer, hydrogenated styrene-butadiene-divinylbenzene terpolymer, hydrogenated styrene-butadiene-maleic anhydride terpolymer, vinyl-polybutadiene-urethane oligomer, maleic anhydride-butadiene copolymer, or a combination thereof.

In some embodiments, the present disclosure uses the hydrogenated styrene-butadiene block copolymer G1726 (i.e., SEBS) available from Kraton, polybutadiene B-3000 available from Nippon Soda and styrene-butadiene block copolymer SBS-C available from Nippon Soda.

Unless otherwise specified, relative to a total of 100 parts by weight of (A) the unsaturated C=C double bond-containing polyphenylene ether resin, the amount of the polyolefin is preferably 13 parts by weight to 35 parts by weight.

In addition to the components above, the resin composition disclosed herein may further optionally comprise maleimide resin, benzoxazine resin, epoxy resin, organic silicone resin, cyanate ester resin, active ester, phenolic resin, styrene maleic anhydride, amine curing agent, polyamide, polyimide or a combination thereof. These components should be construed as including their modifications.

Unless otherwise specified, relative to a total of 100 parts by weight of (A) the unsaturated C=C double bond-containing polyphenylene ether resin, any one of maleimide resin, benzoxazine resin, epoxy resin, organic silicone resin, cyanate ester resin, active ester, phenolic resin, styrene maleic anhydride, amine curing agent, polyamide and polyimide as described above may range from 1 part by weight to 100 parts by weight, and the ratio therebetween can be adjusted according to the need.

The maleimide resin suitable for the resin composition of the present disclosure is not particularly limited and may include any one or more maleimide resins useful for preparing a prepreg, a resin film, a laminate or a printed circuit board. In some embodiments, the maleimide resin may comprise, but not limited to, 4,4'-diphenylmethane bismaleimide, polyphenylmethane maleimide (a.k.a. oligomer of phenylmethane maleimide), bisphenol A diphenyl ether bismaleimide, 3,3'-dimethyl-5,5'-diethyl-4,4'-diphenylmethane bismaleimide, 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenylmaleimide, vinyl benzyl maleimide (VBM), maleimide resin containing aliphatic long chain structure, prepolymer of diallyl compound and maleimide resin, prepolymer of diamine and maleimide resin, prepolymer of multi-functional amine and maleimide resin, prepolymer of acid phenol compound and maleimide resin, or a combination thereof. These components should be construed as including their modifications.

For example, the maleimide resin may include, but not limited to, products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000 and BMI-7000H available from Daiwakasei Industry Co., Ltd., or products such as BMI-70 and BMI-80 available from K.I Chemical Industry Co., Ltd.

For example, the maleimide resin containing aliphatic long chain structure, also known as imide-extended maleimide resin, may include various imide-extended maleimide resins disclosed in the TW Patent Application Publication No. 200508284A, all of which are incorporated herein by reference in their entirety. The maleimide resin containing aliphatic long chain structure suitable for the present disclosure may include, but not limited to, products such as BMI-689, BMI-1400, BMI-1500, BMI-1700, BMI-2500, BMI-3000, BMI-5000 and BMI-6000 available from Designer Molecules Inc.

Examples of the benzoxazine resin suitable for the resin composition of the present disclosure are not particularly limited and may comprise various benzoxazine resins known in the art to which this disclosure pertains; examples include but are not limited to bisphenol A benzoxazine resin, bisphenol F benzoxazine resin, phenolphthalein benzoxazine resin, dicyclopentadiene benzoxazine resin, phosphorus-containing benzoxazine resin, diamino benzoxazine resin, vinyl-containing benzoxazine resin, or a combination thereof. The diamino benzoxazine resin may include oxydianiline benzoxazine resin, diamino bisphenol F benzoxazine resin, diamino diphenyl benzoxazine resin, or a combination thereof. For example, the benzoxazine resin may be, but not limited to, a benzoxazine resin LZ-8260, LZ-8270, LZ-8280, LZ-8290 or LPY 11051 available from Huntsman, a benzoxazine resin PF-3500 available from Chang Chun Plastics or a benzoxazine resin HFB-2006M available from Showa High Polymer.

The epoxy resin suitable for the resin composition of the present disclosure may be any epoxy resin known in the field to which this disclosure pertains, including but not limited to bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, isocyanate-modified epoxy resin, or a combination thereof. The novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin. The phosphorus-containing epoxy resin may be 9,10-dihydro-9-oxa-10-phosphaphenanthrene-10-oxide (DOPO) epoxy resin, DOPO-HQ epoxy resin or a combination thereof. The DOPO epoxy resin may comprise DOPO-containing phenol novolac epoxy resin, DOPO-containing o-cresol novolac epoxy resin, DOPO-containing bisphenol-A novolac epoxy resin, or a combination thereof, the DOPO-HQ epoxy resin may comprise DOPO-HQ-containing phenol novolac epoxy resin, DOPO-HQ-containing o-cresol novolac epoxy resin, DOPO-HQ-containing bisphenol-A novolac epoxy resin, or a combination thereof.

The organic silicone resin suitable for the resin composition of the present disclosure may be any organic silicone resin known in the field to which this disclosure pertains, including but not limited to polyalkylsiloxane, polyarylsiloxane, polyalkarylsiloxane, modified polysiloxane or a combination thereof. Preferably, the organic silicone resin suitable for the present disclosure is an amino-modified organic silicone resin, such as but not limited to amino-modified organic silicone resins KF-8010, X-22-161A, X-22-161B, KF-8012, KF-8008, X-22-9409, and X-22-1660B-3 available from Shin-Etsu Chemical Co., Ltd., amino-modified organic silicone resins BY-16-853U, BY-16-853, and BY-16-853B available from Toray-Dow coming Co., Ltd., amino-modified organic silicone resins XF42-C5742, XF42-C6252 and XF42-C5379 available from Momentive Performance Materials JAPAN LLC, or a combination thereof.

The cyanate ester resin suitable for the resin composition of the present disclosure is not particularly limited and may be any cyanate ester resin with an Ar—O—C≡N structure, wherein Ar represents a substituted or unsubstituted aromatic group. Examples of the cyanate ester resin include but are not limited to novolac cyanate ester resin, bisphenol A cyanate ester resin, bisphenol F cyanate ester resin, dicyclopentadiene-containing cyanate ester resin, naphthalene-containing cyanate ester resin, phenolphthalein cyanate ester resin, adamantane cyanate ester resin, fluorene cyanate ester resin or a combination thereof. The novolac cyanate ester resin may comprise bisphenol A novolac cyanate ester resin, bisphenol F novolac cyanate ester resin, phenol novolac cyanate ester resin or a combination thereof. For example, the cyanate ester resin may be available under the product name Primaset PT-15, PT-30S, PT-60S, BA-200, BA-230S, BA-3000S, BTP-2500, BTP-6020S, DT-4000, DT-7000, ULL-950S, HTL-300, CE-320, LVT-50 or LeCy sold by Arxada AG., but not limited thereto.

The active ester suitable for the resin composition of the present disclosure may be any active polyester resin known in the field to which this disclosure pertains, including but not limited to various commercially available active polyester resin products. Examples include, but not limited to, active polyester resin products HPC-8000 and HPC-8150 available from D.I.C. Corporation.

The phenolic resin suitable for the resin composition of the present disclosure may comprise, but not limited to, mono-functional, bifunctional or multifunctional phenolic resin, comprising phenolic resin of a resin composition conventionally useful for making prepregs, such as phenol resin, phenoxy resin, novolac resin, etc. The novolac resin comprises phenol novolac resin, o-cresol novolac resin, or bisphenol A novolac resin.

The styrene maleic anhydride suitable for the resin composition of the present disclosure may comprise any styrene maleic anhydride known in the field to which this disclosure pertains, wherein the molar ratio of styrene (S) to maleic anhydride (MA) may be 1:1, 2:1, 3:1, 4:1, 6:1, 8:1 or 12:1. The styrene maleic anhydride suitable for the resin composition of the present disclosure may include, but not limited to, styrene maleic anhydride such as SMA-1000, SMA-2000, SMA-3000, EF-30, EF-40, EF-60 and EF-80 available from Cray Valley, or styrene maleic anhydride such as C400, C500, C700 and C900 available from Polyscope.

The amine curing agent suitable for the resin composition of the present disclosure may include, but not limited to, diamino diphenyl sulfone, diamino diphenyl methane, diamino diphenyl ether, diamino diphenyl sulfide, dicyandiamide, or a combination thereof.

The polyamide suitable for the resin composition of the present disclosure may be any polyamide resin known in the field to which this disclosure pertains, including but not limited to various commercially available polyamide resin products.

The polyimide suitable for the resin composition of the present disclosure may be any polyimide resin known in the field to which this disclosure pertains, including but not limited to various commercially available polyimide resin products.

In addition to the aforesaid components, the resin composition disclosed herein may optionally further comprise a flame retardant, a second curing accelerator, a polymerization inhibitor, a third solvent, a third silane coupling agent, a surfactant, a coloring agent, a toughening agent or a combination thereof.

Unless otherwise specified, the amount of flame retardant used in the resin composition of the present disclosure may be adjusted according to the need; for example, but not limited thereto, relative to a total of 100 parts by weight of (A) the unsaturated C=C double bond-containing polyphenylene ether resin, the amount of flame retardant may be 1 to 100 parts by weight.

The flame retardant suitable for the resin composition of the present disclosure may be any one or more flame retardants useful for preparing a prepreg, a resin film, a laminate or a printed circuit board, examples including but not limited to bromine-containing flame retardant or phosphorus-containing flame retardant, the bromine-containing flame retardant preferably comprising decabromodiphenyl ethane, and the phosphorus-containing flame retardant preferably comprising: ammonium polyphosphate, p-hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO and its derivatives (such as di-DOPO compounds) or resins, diphenylphosphine oxide (DPPO) and its derivatives (such as di-DPPO compounds) or resins, melamine cyanurate, trihydroxy ethyl isocyanurate, aluminium phosphinate (e.g., commercially available OP-930 and OP-935) or a combination thereof.

For example, the flame retardant may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN), and a DOPO-containing epoxy resin, wherein DOPO-PN is a DOPO-containing phenol novolac resin, and DOPO-BPN may be a DOPO-containing bisphenol novolac resin, such as DOPO-bisphenol A novolac (DOPO-BPAN), DOPO-bisphenol F novolac (DOPO-BPFN) and DOPO-bisphenol S novolac (DOPO-BPSN).

Unless otherwise specified, the amount of second curing accelerator, polymerization inhibitor, third silane coupling agent, surfactant and coloring agent used in the present disclosure may be adjusted according to the need; for example, but not limited thereto, relative to a total of 100 parts by weight of (A) the unsaturated C=C double bond-containing polyphenylene ether resin, the amount of any one aforesaid component may be 1 to 20 parts by weight. Preferably, the amount of the second curing accelerator may be 0.5 to 5.0 parts by weight, preferably 0.5 to 0.6 part by weight.

The type of the second curing accelerator suitable for the resin composition of the present disclosure is not particularly limited and may comprise any one or a combination thereof as exemplified above for the first curing accelerator. Preferably, the second curing accelerator is the curing initiator and is more preferably 2,5-dimethyl-2,5-di(t-butylperoxy)-3-hexyne.

As used herein, the polymerization inhibitor suitable for the resin composition of the present disclosure is used to inhibit the polymerization reaction, and examples thereof are not particularly limited, which may include various molecule type polymerization inhibitors, stable free radical type polymerization inhibitors or a combination thereof known in the field to which this disclosure pertains. For example, molecule type polymerization inhibitors suitable for the present disclosure include but are not limited to phenols, quinones, arylamines, arene nitro compounds, sulfur-containing compounds, chlorides of metal with variable valency or a combination thereof. More specifically, molecule type polymerization inhibitors suitable for the present disclosure include but are not limited to phenol, hydroquinone, 4-tert-butylcatechol, benzoquinone, chloroquinone, 1,4-naphthoquinone, trimethylquinone, aniline, nitrobenzene, $Na_2S$, $FeCl_3$, $CuCl_2$ or a combination thereof. For example, mediated radical type polymerization inhibitors suitable for the present disclosure include but are not limited to 1,1-diphenyl-2-picrylhydrazyl radical (DPPH), triphenylmethyl radical or a combination thereof.

The purpose of adding a third solvent to the resin composition according to the present disclosure is to dissolve the components in the resin composition so as to change the solid content of the resin composition and to adjust the viscosity of the resin composition. The type of the third solvent suitable for the resin composition of the present disclosure is not particularly limited and may comprise, but not limited to, any one or a combination thereof as exemplified above for the second solvent.

The third silane coupling agent suitable for the resin composition of the present disclosure may comprise silane (such as but not limited to siloxane), examples including but not limited to amino silane, epoxide silane, vinyl silane, ester silane, hydroxyl silane, isocyanate silane, methacryloxy silane, acryloxy silane or a combination thereof.

The type of the surfactant suitable for the resin composition of the present disclosure is not particularly limited. The purpose of surfactant used herein is to ensure uniform distribution of the filler in the resin composition.

The coloring agent (i.e., staining agent) suitable for the resin composition of the present disclosure may comprise, but not limited to, dye or pigment.

The purpose of toughening agent used herein is to improve the toughness of the resin composition. The toughening agent may comprise, but not limited to, carboxyl-terminated butadiene acrylonitrile rubber (CTBN rubber), core-shell rubber, etc.

Unless otherwise specified, the amount of toughening agent used in the resin composition of the present disclosure may be adjusted according to the need; for example, but not limited thereto, relative to a total of 100 parts by weight of (A) the unsaturated C=C double bond-containing polyphenylene ether resin, the amount of toughening agent may be 5 to 50 parts by weight.

The resin compositions of various embodiments of the present disclosure may be processed by various methods into different articles, including but not limited to a prepreg, a resin film, a laminate or a printed circuit board.

For example, the resin compositions of various embodiments may be used to make prepregs.

In one embodiment, the prepreg disclosed herein has a reinforcement material and a layered structure formed thereon, wherein the layered structure is made by heating the resin composition at high temperature to a semi-cured state (B-stage). Suitable baking temperature for making the prepreg may be for example 120° C. to 180° C. For example, the reinforcement material may be any one of a fiber material, woven fabric, and non-woven fabric, and the woven fabric preferably comprises fiberglass fabrics. Types of fiberglass fabrics are not particularly limited and may be any commercial fiberglass fabric useful for various printed circuit boards, such as E-glass fiber fabric, D-glass fiber fabric, S-glass fiber fabric, T-glass fiber fabric, L-glass fiber fabric or Q-glass fiber fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pretreated by a silane coupling agent. The prepreg may be further heated and cured to the C-stage to form an insulation layer.

In one embodiment, by well mixing each resin composition to form a varnish, loading the varnish into an impregnation tank, impregnating a fiberglass fabric into the impregnation tank to adhere the resin composition onto the fiberglass fabric, and proceeding with heating and baking at a proper temperature to a semi-cured state, a prepreg may be obtained.

For example, the article made from the resin composition disclosed herein may be a resin film which is prepared by heating and baking the resin composition to the semi-cured state. For example, by selectively coating the resin composition on a liquid crystal polymer film, a polyethylene terephthalate film (PET film) or a polyimide film, followed by heating and baking at a proper temperature to a semi-cured state, a resin film may be obtained. For example, the resin composition from each embodiment may be coated on a copper foil to uniformly adhere the resin composition thereon, followed by heating and baking at a proper temperature to a semi-cured state to obtain the resin film.

For example, the resin composition of the present disclosure may be made into a laminate, which comprises at least two metal foils and at least one insulation layer disposed between the metal foils, wherein the insulation layer is made by curing the resin composition at high temperature and high pressure to the C-stage, a suitable curing temperature being for example between 190° C. and 220° C. and preferably between 200° C. and 210° C. and a suitable curing time being 90 to 180 minutes and preferably 120 to 150 minutes. The insulation layer may be obtained by curing the aforesaid prepreg or resin film. The metal foil may contain copper, aluminum, nickel, platinum, silver, gold or alloy thereof, such as a copper foil. In a preferred embodiment, the laminate is a copper-clad laminate.

In one embodiment, the laminate may be further processed by trace formation processes to obtain a printed circuit board.

For example, a double-sided copper-clad laminate (such as product EM-827, available from Elite Material Co., Ltd.) with a thickness of 28 mil and having a 1 ounce (oz) HTE (high temperature elongation) copper foil may be used and subjected to drilling and then electroplating, so as to form electrical conduction between the upper layer copper foil and the bottom layer copper foil. Then the top layer copper foil and the bottom layer copper foil are etched to form inner layer circuits. Then brown oxidation and roughening are performed on the inner layer circuits to form uneven structures on the surface to increase roughness. Next, a vacuum lamination apparatus is used to laminate the assembly of a copper foil, the prepreg, the inner layer circuit board, the prepreg and a copper foil stacked in said order by heating at 190° C. to 220° C. for 90 to 180 minutes to cure the insulation material of the prepregs. Next, black oxidation, drilling, copper plating and other known circuit board processes are performed on the outmost copper foils so as to obtain the printed circuit board.

In one or more embodiments, the resin composition of the present disclosure and various articles made therefrom may preferably have any one, more or all of the following properties:

the prepreg having a smooth appearance and even color under visual inspection; the article having a copper foil peeling strength as measured by reference to IPC-TM-650 2.4.8 of greater than or equal to 3.8 lb/inch, such as between 3.8 lb/inch and 5.0 lb/inch;

no delamination occurs after subjecting the article to a thermal resistance after moisture absorption test by reference to IPC-TM-650 2.6.16.1 and IPC-TM-650 2.4.23;

the article having a water absorption rate as measured by reference to IPC-TM-650 2.6.2.1 of less than or equal to 0.30%, such as between 0.14% and 0.30%;

the article having a dissipation factor variation rate under moisture and heat of less than or equal to 40%, such as between 14% and 40%, as calculated according to a dissipation factor measured at room temperature and a dissipation factor measured after the article is placed under a temperature of 85° C. and a relative humidity of 85% for 48 hours, both being measured by reference to JIS C2565 at 10 GHz; and the article being without branch-like pattern under visual inspection.

The resin compositions of various Examples (Table 1 and Table 2) and Comparative Examples (Table 3 and Table 4) of the present disclosure are formulated and further fabricated to prepare test samples or articles.

The names of reagents used in the Examples and Comparative Examples are as follows:

1. unsaturated C=C double bond-containing polyphenylene ether resin: methacryloyl polyphenylene ether resin, product name SA9000, available from Sabic.
2. unsaturated C=C double bond-containing polyphenylene ether resin: vinylbenzyl polyphenylene ether resin, product name OPE-2st 1200, available from Mitsubishi Gas Chemical Co., Inc.
3. unsaturated C=C double bond-containing polyphenylene ether resin: vinylbenzyl polyphenylene ether resin, product name OPE-2st 2200, available from Mitsubishi Gas Chemical Co., Inc.
4. unsaturated C=C double bond-containing crosslinking agent: triallyl isocyanurate, product name TAIC, available from Kingyorker Enterprise Co., Ltd.
5. unsaturated C=C double bond-containing crosslinking agent: divinylbenzene, product name DVB, available from Sigma Aldrich.
6. unsaturated C=C double bond-containing crosslinking agent: bis(vinylphenyl)ethane, product name BVPE, available from Linchuan Chemical Co., Ltd.
7. silane coupling agent: 3-methacryloxypropyl trimethoxysilane, product name KBM-503, available from Shin Etsu.
8. silane coupling agent: 3-glycidoxypropyl trimethoxysilane, product name KBM-403, available from Shin Etsu.
9. silane coupling agent: 3-aminopropyltrimethoxysilane, product name KBM-903, available from Shin Etsu.
10. silane coupling agent: phenyltrimethoxysilane, product name KBM-103, available from Shin Etsu.
11. silane coupling agent: 3-mercaptopropylmethyldimethoxysilane, product name KBM-802, available from Shin Etsu.
12. non-hollow filler: spherical silica, product name SC2500, available from Admatechs.
13. non-hollow filler: spherical silica, product name SC1050, available from Admatechs.
14. hollow filler: spherical hollow glass, product name iM30K, available from 3M.
15. hollow filler: spherical hollow silica, available from Qichen New Material Technology Co., Ltd.
16. polyolefin: polybutadiene, product name B-3000, available from Nippon Soda Co., Ltd.
17. polyolefin: hydrogenated styrene-butadiene block copolymer, product name G1726, available from Kraton Corporation.
18. polyolefin: styrene-butadiene block copolymer, product name SBS-C, available from Nippon Soda Co., Ltd.
19. second curing accelerator: 2,5-dimethyl-2,5-di(t-butylperoxy)-3-hexyne, product name 25B, available from NOF Corporation.
20. second and third solvents: toluene, available from Sinopec Group.

A proper amount (abbreviated as "PA") in Tables 1-4 represents an amount of solvent suitable for obtaining a desired solid content for the resin composition, such as a solid content of the varnish in Tables 1-4 being 65 wt %.

The reagents prepared by the Applicant used in the Examples and Comparative Examples are described as follows:

Preparation Example C1

Preparation of the first precursor: the hollow filler iM30K was stirred for 3 hours at high speed in a 15% mass fraction of NaOH solution at 50° C., and then washed with water to neutral, followed by suction filtration and drying at 100° C. to obtain the surface-hydroxylated hollow filler; the surface-hydroxylated hollow filler and the first silane coupling agent KBM-503 (1.5% by mass of the hollow filler) were added to the first solvent formed by mixing ethanol and water (volume ratio of ethanol to water is 10:1) and stirred for 4 hours at high speed at 50° C., followed by suction filtration and drying at 80° C. to obtain the first precursor C1-1.

Preparation of the second precursor: non-hollow filler SC2500 was used in place of the hollow filler iM30K and stirred for 2 hours at high speed in a 5% mass fraction of NaOH solution at 50° C., KBM-802 (1.0% by mass of the non-hollow filler) was chosen as the second silane coupling agent, and the remaining steps were the same as those used in the preparation of the first precursor to obtain the second precursor C1-2.

Figure 2:
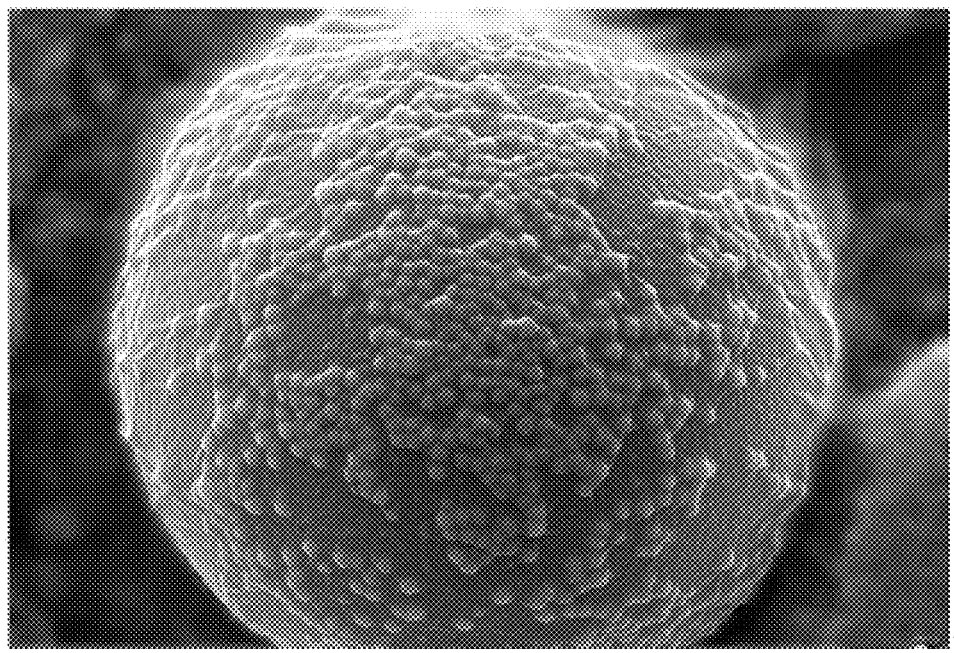
FIG. 2 is the SEM image of the inventive filler C1.

Chemical connection of the first precursor and the second precursor: 20 g of the first precursor C1-1 and 180 g of the second precursor C1-2 were added to 500 mL of toluene as the second solvent and well mixed and then, in the presence of 0.5 g of triphenylphosphine as the first curing accelerator, stirred at high speed and reacted at 95° C. for 2 hours. The solution was cooled to room temperature and stood still for 12 hours; the supernatant was discarded, and the solid portion was dried under vacuum at 70° C. to obtain white solid powder C1, which was the filler C1. FIG. 2 illustrates the SEM image of the filler C1, wherein the hollow filler is the large particle size sphere and the non-hollow filler is the small particle size sphere.

Preparation Example C2

Preparation of the first precursor: the hollow filler iM30K was stirred for 3 hours at high speed in a 15% mass fraction of NaOH solution at 50° C., and then washed with water to neutral, followed by suction filtration and drying at 100° C. to obtain the surface-hydroxylated hollow filler; the surface-hydroxylated hollow filler and the first silane coupling agent KBM-403 (1.5% by mass of the hollow filler) were added to the first solvent formed by mixing ethanol and water (volume ratio of ethanol to water is 10:1) and stirred for 4 hours at high speed at 50° C., followed by suction filtration and drying at 80° C. to obtain the first precursor C2-1.

Preparation of the second precursor: non-hollow filler SC2500 was used in place of the hollow filler iM30K and stirred for 2 hours at high speed in a 5% mass fraction of NaOH solution at 50° C., KBM-903 (1.0% by mass of the non-hollow filler) was chosen as the second silane coupling agent, and the remaining steps were the same as those used in the preparation of the first precursor to obtain the second precursor C2-2.

Chemical connection of the first precursor and the second precursor: 20 g of the first precursor C2-1 and 180 g of the second precursor C2-2 were added to 500 mL of toluene as the second solvent and well mixed and then, in the presence of 0.5 g of 2-ethyl-4-methylimidazole as the first curing accelerator, stirred at high speed and reacted at 100° C. for 2.5 hours. The solution was cooled to room temperature and stood still for 12 hours; the supernatant was discarded, and the solid portion was dried under vacuum at 70° C. to obtain white solid powder C2, which was the filler C2.

Preparation Example C3

Preparation of the first precursor: the hollow filler iM30K was stirred for 3 hours at high speed in a 15% mass fraction of NaOH solution at 50° C., and then washed with water to neutral, followed by suction filtration and drying at 100° C. to obtain the surface-hydroxylated hollow filler; the surface-hydroxylated hollow filler and the first silane coupling agent KBM-802 (1.5% by mass of the hollow filler) were added to the first solvent formed by mixing ethanol and water (volume ratio of ethanol to water is 10:1) and stirred for 4 hours at high speed at 50° C., followed by suction filtration and drying at 80° C. to obtain the first precursor C3-1.

Preparation of the second precursor: non-hollow filler SC2500 was used in place of the hollow filler iM30K and stirred for 2 hours at high speed in a 5% mass fraction of NaOH solution at 50° C., KBM-503 (1.0% by mass of the non-hollow filler) was chosen as the second silane coupling agent, and the remaining steps were the same as those used in the preparation of the first precursor to obtain the second precursor C3-2.

Chemical connection of the first precursor and the second precursor: 20 g of the first precursor C3-1 and 180 g of the second precursor C3-2 were added to 500 mL of toluene as the second solvent and well mixed and then, in the presence of 0.5 g of triphenylphosphine as the first curing accelerator, stirred at high speed and reacted at 95° C. for 2 hours. The solution was cooled to room temperature and stood still for 12 hours; the supernatant was discarded, and the solid portion was dried under vacuum at 70° C. to obtain white solid powder C3, which was the filler C3.

Preparation Example C4

Preparation of the first precursor: the hollow filler iM30K was stirred for 3 hours at high speed in a 15% mass fraction of NaOH solution at 50° C., and then washed with water to neutral, followed by suction filtration and drying at 100° C. to obtain the surface-hydroxylated hollow filler. The surface-hydroxylated hollow filler and the first silane coupling agent KBM-903 (0.5% by mass of the hollow filler) were added to the first solvent formed by mixing ethanol and water (volume ratio of ethanol to water is 10:1) and stirred for 4 hours at high speed at 50° C., followed by suction filtration and drying at 80° C. to obtain the first precursor C4-1.

Preparation of the second precursor: non-hollow filler SC2500 was used in place of the hollow filler iM30K and stirred for 2 hours at high speed in a 5% mass fraction of NaOH solution at 50° C., KBM-403 (0.5% by mass of the non-hollow filler) was chosen as the second silane coupling agent, and the remaining steps were the same as those used in the preparation of the first precursor to obtain the second precursor C4-2.

Chemical connection of the first precursor and the second precursor: 20 g of the first precursor C4-1 and 180 g of the second precursor C4-2 were added to 500 mL of toluene as the second solvent and well mixed and then, in the presence of 0.5 g of 2-ethyl-4-methylimidazole as the first curing accelerator, stirred at high speed and reacted at 100° C. for 2.5 hours. The solution was cooled to room temperature and stood still for 12 hours; the supernatant was discarded, and the solid portion was dried under vacuum at 70° C. to obtain white solid powder C4, which was the filler C4.

Preparation Example C5

Preparation of the first precursor: the same as PREPARATION EXAMPLE C1.

Preparation of the second precursor: the same as PREPARATION EXAMPLE C1.

Chemical connection of the first precursor and the second precursor: 6 g of the first precursor C1-1 and 194 g of the second precursor C1-2 were added to 500 mL of toluene as the second solvent and well mixed and then, in the presence of 0.5 g of triphenylphosphine as the first curing accelerator, stirred at high speed and reacted at 95° C. for 2 hours. The solution was cooled to room temperature and stood still for 12 hours; the supernatant was discarded, and the solid portion was dried under vacuum at 70° C. to obtain white solid powder C5, which was the filler C5.

Preparation Example C6

Preparation of the first precursor: the same as PREPARATION EXAMPLE C1.

Preparation of the second precursor: the same as PREPARATION EXAMPLE C1.

Chemical connection of the first precursor and the second precursor: 40 g of the first precursor C1-1 and 160 g of the second precursor C1-2 were added to 500 mL of toluene as the second solvent and well mixed and then, in the presence of 0.5 g of triphenylphosphine as the first curing accelerator, stirred at high speed and reacted at 95° C. for 2 hours. The solution was cooled to room temperature and stood still for 12 hours; the supernatant was discarded, and the solid portion was dried under vacuum at 70° C. to obtain white solid powder C6, which was the filler C6.

Preparation Example C7

Preparation of the first precursor: the hollow filler iM30K was stirred for 3 hours at high speed in a 15% mass fraction of NaOH solution at 50° C., and then washed with water to neutral, followed by suction filtration and drying at 100° C. to obtain the surface-hydroxylated hollow filler; the surface-hydroxylated hollow filler and the first silane coupling agent KBM-503 (3.5% by mass of the hollow filler) were added to the first solvent formed by mixing ethanol and water (volume ratio of ethanol to water is 10:1) and stirred for 4 hours at high speed at 50° C., followed by suction filtration and drying at 80° C. to obtain the first precursor C7-1.

Preparation of the second precursor: non-hollow filler SC2500 was used in place of the hollow filler iM30K and stirred for 2 hours at high speed in a 5% mass fraction of NaOH solution at 50° C., KBM-802 (1.0% by mass of the non-hollow filler) was chosen as the second silane coupling agent, and the remaining steps were the same as those used in the preparation of the first precursor to obtain the second precursor C7-2.

Chemical connection of the first precursor and the second precursor: 50 g of the first precursor C7-1 and 150 g of the second precursor C7-2 were added to 500 mL of toluene as the second solvent and well mixed and then, in the presence of 0.5 g of triphenylphosphine as the first curing accelerator, stirred at high speed and reacted at 95° C. for 2 hours. The solution was cooled to room temperature and stood still for 12 hours; the supernatant was discarded, and the solid portion was dried under vacuum at 70° C. to obtain white solid powder C7, which was the filler C7.

Preparation Example C8

Preparation of the first precursor: the same as PREPARATION EXAMPLE C1.

Preparation of the second precursor: the same as PREPARATION EXAMPLE C1.

Chemical connection of the first precursor and the second precursor: 60 g of the first precursor C1-1 and 140 g of the second precursor C1-2 were added to 500 mL of toluene as the second solvent and well mixed and then, in the presence of 0.5 g of triphenylphosphine as the first curing accelerator, stirred at high speed and reacted at 95° C. for 2 hours. The solution was cooled to room temperature and stood still for 12 hours; the supernatant was discarded, and the solid portion was dried under vacuum at 70° C. to obtain white solid powder C8, which was the filler C8.

Preparation Example C9

Preparation of the first precursor: hollow silica as the hollow filler was stirred for 2 hours at high speed in a 5% mass fraction of NaOH solution at 50° C., and then washed with water to neutral, followed by suction filtration and drying at 100° C. to obtain the surface-hydroxylated hollow filler; the surface-hydroxylated hollow filler and the first silane coupling agent KBM-503 (1.5% by mass of the hollow filler) were added to the first solvent formed by mixing ethanol and water (volume ratio of ethanol to water is 10:1) and stirred for 4 hours at high speed at 50° C., followed by suction filtration and drying at 80° C. to obtain the first precursor C9-1.

Preparation of the second precursor: non-hollow filler SC1050 was used in place of the hollow silica, KBM-802 (2.5% by mass of the non-hollow filler) was chosen as the second silane coupling agent, and the remaining steps were the same as those used in the preparation of the first precursor to obtain the second precursor C9-2.

Chemical connection of the first precursor and the second precursor: 20 g of the first precursor C9-1 and 180 g of the second precursor C9-2 were added to 500 mL of toluene as the second solvent and well mixed and then, in the presence of 0.5 g of triphenylphosphine as the first curing accelerator, stirred at high speed and reacted at 95° C. for 2 hours. The solution was cooled to room temperature and stood still for 12 hours; the supernatant was discarded, and the solid portion was dried under vacuum at 70° C. to obtain white solid powder C9, which was the filler C9.

Preparation Example X1

Figure 3:
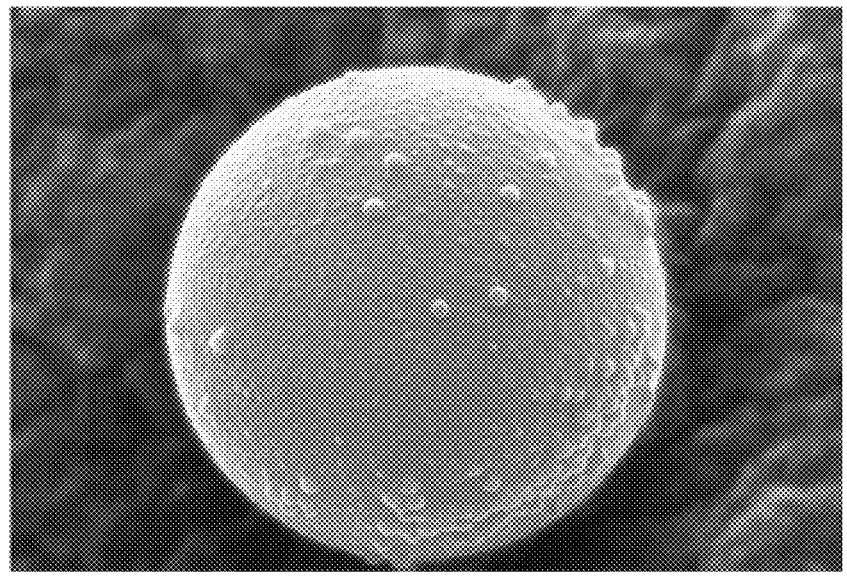
FIG. 3 is the SEM image of the non-inventive filler X1.

The hollow filler iM30K was stirred for 3 hours at high speed in a 15% mass fraction of NaOH solution at 50° C., and then washed with water to neutral, followed by suction filtration and drying at 100° C. to obtain the surface-hydroxylated hollow filler. The non-hollow filler SC2500 was stirred for 2 hours at high speed in a 5% NaOH solution at 50° C., and then washed with water to neutral, followed by suction filtration and drying at 100° C. to obtain the surface-hydroxylated non-hollow filler. 20 g of the surface-hydroxylated hollow filler, 180 g of the surface-hydroxylated non-hollow filler, 0.3 g of KBM-802 silane coupling agent (1.5% by mass of the hollow filler) and 1.8 g of KBM-503 silane coupling agent (1.0% by mass of the non-hollow filler) were added to 500 mL of toluene, followed by the addition of 0.5 g of triphenylphosphine and stirring at high speed and reacted at 95° C. for 2 hours. The solution was cooled to room temperature and stood still for 12 hours; the supernatant was discarded, and the solid portion was dried under vacuum at 70° C. to obtain white solid powder X1. FIG. 3 illustrates the SEM image of the filler X1, wherein the hollow filler is the large particle size sphere and the non-hollow filler is the small particle size sphere.

Preparation Example X2

The hollow filler iM30K was stirred for 3 hours at high speed in a 15% mass fraction of NaOH solution at 50° C., and then washed with water to neutral, followed by suction filtration and drying at 100° C. to obtain the surface-hydroxylated hollow filler. The surface-hydroxylated hollow filler and KBM-802 silane coupling agent (1.5% by mass of the hollow filler) were added to the solvent mixture containing ethanol and water (volume ratio of ethanol to water is 10:1) and stirred for 4 hours at high speed at 50° C., followed by suction filtration and drying at 80° C. to obtain the KBM-802 pretreated hollow filler X2-1.

With the similar process, the non-hollow filler SC2500 was used in place of the hollow filler iM30K and stirred for 2 hours at high speed in a 5% mass fraction of NaOH solution at 50° C., 1.0% of KBM-103 was used in place of 1.5% of KBM-802, and the KBM-103 pretreated non-hollow filler X2-2 was obtained. KBM-103 was not reacted with KBM-802 and failed to form a covalent bond with KBM-802.

Figure 4:
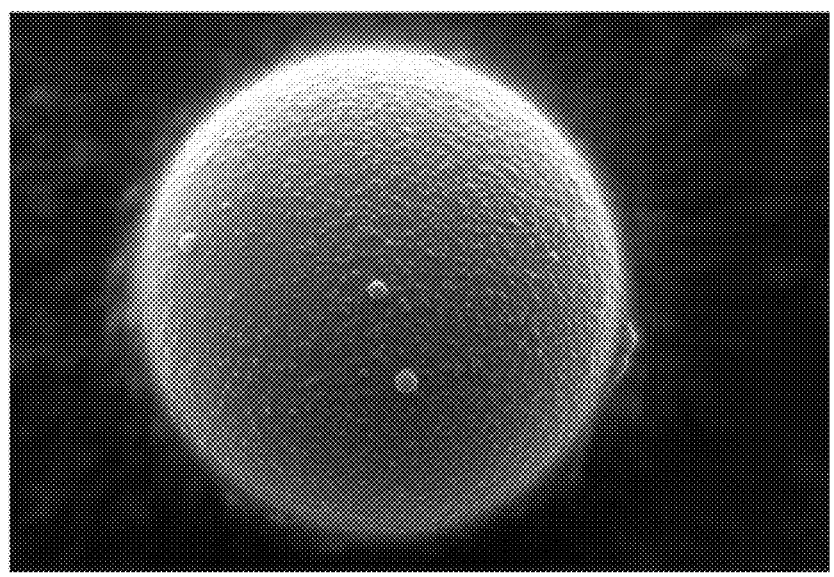
FIG. 4 is the SEM image of the non-inventive filler X2.

20 g of X2-1 and 180 g of X2-2 were added to 500 mL of toluene, followed by adding 0.5 g of triphenylphosphine and stirring at high speed and reacted at 95° C. for 2 hours. The solution was cooled to room temperature and stood still for 12 hours; the supernatant was discarded, and the solid portion was dried under vacuum at 70° C. to obtain white solid powder X2. FIG. 4 illustrates the SEM image of the filler X2, wherein the hollow filler is the large particle size sphere and the non-hollow filler is the small particle size sphere.

For the property tests of Examples E1 to E16 and Comparative Examples CE1 to CE10 listed in Table 1 to Table 4, samples (specimens) were prepared as described below and tested under specified conditions as follows.

1. Prepreg: Resin composition from each Example (Tables 1 and 2) or each Comparative Example (Tables 3 and 4) was individually well-mixed to form a varnish (solid content of 65 wt %), which was then loaded to an impregnation tank; a fiberglass fabric available from Asahi (e.g., 2116 L-glass fiber fabric or 1080 L-glass fiber fabric) was impregnated into the impregnation tank to adhere the resin composition onto the fiberglass fabric, followed by heating at 130° C. to 170° C. to a semi-cured stage (B-stage) to obtain a prepreg.

2. Copper-clad laminate (6-ply, formed by lamination of six prepregs): Two 35 μm HVLP (hyper very low profile) copper foils and six prepregs obtained from 2116 L-glass fiber fabrics impregnated with each Example or Comparative Example and having a resin content of about 55 wt % were prepared and stacked in the order of one HVLP copper foil, six prepregs and one HVLP copper foil, followed by lamination under vacuum at 420 psi and 200° C. for 2 hours to form a copper-clad laminate. Insulation layers between the two copper foils were formed by laminating six sheets of prepreg, and the resin content of the insulation layers is about 55 wt %.

3. Copper-free laminate (6-ply, formed by lamination of six prepregs): Each aforesaid copper-clad laminate was etched to remove the two copper foils to obtain a copper-free laminate (6-ply), which was formed by laminating six sheets of prepreg and had a resin content of about 55 wt %.

4. Copper-free laminate (2-ply, formed by lamination of two prepregs): Two 18 μm HVLP (hyper very low profile) copper foils and two prepregs obtained from 1080 L-glass fiber fabrics impregnated with each Example or Comparative Example were prepared and stacked in the order of one copper foil, two prepregs and one copper foil, followed by lamination under vacuum at 420 psi and 200° C. for 2 hours to form a copper-clad laminate (2-ply, formed by lamination of two prepregs). Next, each copper-clad laminate was etched to remove the copper foils on both sides to obtain a copper-free laminate (2-ply) which is formed by laminating two prepregs and has a resin content of about 70 wt %.

Each sample was analyzed as described below.

1. Prepreg Appearance

The prepreg obtained by impregnating the 2116 L-glass fiber fabric with each Example or Comparative Example was used as the sample and examined with naked eyes to determine whether the appearance of the prepreg is smooth and the color is even; if the prepreg had a smooth appearance and even color under visual inspection, a designation of "OK" was given; if the prepreg did not have a smooth appearance or even color under visual inspection, a designation of "NG" was given.

2. Copper Foil Peeling Strength (i.e., Peeling Strength, P/S)

The copper-clad laminate (obtained by laminating six prepregs) sample was tested by using a tensile strength tester by reference to IPC-TM-650 2.4.8 to measure the copper foil peeling strength. Higher peeling strength represents stronger bonding strength between the copper foil and the insulation layer. Copper-clad laminates using HVLP copper foils usually have lower peeling strength, and there is a technical difficulty in improving the copper foil peeling strength; a difference in copper foil peeling strength of greater than or equal to 0.2 lb/inch represents a substantial difference.

3. Thermal Resistance after Moisture Absorption (Pressure Cooking Test, PCT)

The aforesaid copper-free laminate (6-ply) was used as the sample and subjected to the thermal resistance after moisture absorption test. By reference to IPC-TM-650 2.6.16.1, the sample was subjected to a pressure cooking test (PCT) for 5 hours of moisture absorption (at a temperature of 121° C. and a relative humidity of 100%), and then, by reference to IPC-TM-650 2.4.23, immersed into a 288° C. solder bath for 20 seconds, removed and then inspected to determine the absence or presence of delamination. Each Example or Comparative Example was evaluated by testing three identical samples, and a designation of "X" was given to represent delamination in any sample, indicating interlayer separation or blistering of the insulation layers of the laminate. The absence of delamination, which represents pass (designation of "O"), means no interlayer delamination and blistering occurring between insulation layers. OOO represents no delamination in all three samples, XXX represents delamination in all three samples, OXX represents no delamination in one sample and delamination in two samples, and OOX represents no delamination in two samples and delamination in one sample.

4. Water Absorption Rate

The copper-free laminate (6-ply) sample was subjected to the measurement. By reference to IPC-TM-650 2.6.2.1, the water absorption rate of a sample after 24 hours of soaking in water was measured. Lower water absorption rate indicates better water absorption property of the laminate. A difference in the water absorption rate of greater than or equal to 0.05% represents a substantial difference.

5. Dissipation Factor Variation Rate Under Moisture and Heat (Df Variation Rate Under Moisture and Heat)

A copper-free laminate (2-ply, obtained by laminating two prepregs) sample was tested by using a microwave dielectrometer available from AET Corp. by reference to JIS C2565 at 10 GHz at room temperature (about 25° C.), and the dissipation factor of each sample thus measured is designated as $Df_1$. Then the sample was washed with distilled water and placed in an environment of 85° C. and 85% relative humidity for 48 hours, followed by another measurement of the dissipation factor at 10 GHz, which is designated as $Df_2$. The Df variation rate under moisture and heat, in %, is equal to $((Df_2-Df_1)/Df_1)*100\%$. Lower dissipation factor variation rate under moisture and heat represents a better dielectric stability. A difference in the dissipation factor variation rate under moisture and heat of greater than or equal to 5% represents a substantial difference.

6. Branch-Like Pattern on Laminate

The copper-free laminate (6-ply) sample was examined with naked eyes to determine whether or not a branch-like pattern is present on the surface of the copper-free laminate; if no branch-like pattern is observed, a designation of "N" is given; if a branch-like pattern is observed, the length (mm) of the branch-like pattern is measured with a vernier caliper.

TABLE 1

Resin compositions of Examples E1-E8 (in part by weight) and test results of articles thereof

| Composition | | E1 | E2 | E3 | E4 | E5 | E6 | E7 | E8 |
|---|---|---|---|---|---|---|---|---|---|
| unsaturated C=C double bond-containing polyphenylene ether resin | SA9000 | 100 | 100 | 100 | 100 | 100 | 100 | 100 | 100 |
| | OPE-2st 1200 | | | | | | | | |
| | OPE-2st 2200 | | | | | | | | |
| unsaturated C=C double bond-containing crosslinking agent | TAIC | 25 | 25 | 25 | 25 | 25 | 25 | 25 | 25 |
| | DVB | | | | | | | | |
| | BVPE | | | | | | | | |
| filler | C1 | 100 | | | | | | | |
| | C2 | | 100 | | | | | | |
| | C3 | | | 100 | | | | | |
| | C4 | | | | 100 | | | | |
| | C5 | | | | | 100 | | | |
| | C6 | | | | | | 100 | | |
| | C7 | | | | | | | 100 | |
| | C8 | | | | | | | | 100 |
| second curing accelerator | 25B | 0.5 | 0.5 | 0.5 | 0.5 | 0.5 | 0.5 | 0.5 | 0.5 |
| third solvent | toluene | PA | PA | PA | PA | PA | PA | PA | PA |

| Property | Unit | E1 | E2 | E3 | E4 | E5 | E6 | E7 | E8 |
|---|---|---|---|---|---|---|---|---|---|
| prepreg appearance | / | OK | OK | OK | OK | OK | OK | OK | OK |
| P/S | lb/inch | 4.3 | 4.5 | 4.4 | 4.5 | 3.8 | 5.0 | 4.7 | 4.0 |
| PCT | / | ○○○ | ○○○ | ○○○ | ○○○ | ○○○ | ○○○ | ○○○ | ○○○ |
| water absorption rate | % | 0.21 | 0.24 | 0.23 | 0.25 | 0.19 | 0.23 | 0.27 | 0.30 |
| Df variation rate under moisture and heat | % | 28.6 | 30.7 | 27.4 | 31.3 | 25.6 | 31.5 | 34.7 | 39.7 |
| branch-like pattern on laminate | mm | N | N | N | N | N | N | N | N |

TABLE 2

Resin compositions of Examples E9-E16 (in part by weight) and test results of articles thereof

| Composition | | E9 | E10 | E11 | E12 | E13 | E14 | E15 | E16 |
|---|---|---|---|---|---|---|---|---|---|
| unsaturated C=C double bond-containing polyphenylene ether resin | SA9000 | 100 | 100 | 100 | 100 | 100 | 100 | 100 | 70 |
| | OPE-2st 1200 | | | | | | | | 10 |
| | OPE-2st 2200 | | | | | | | | 20 |
| unsaturated C=C double bond-containing crosslinking agent | TAIC | 25 | 25 | 5 | 25 | 25 | 10 | 10 | 10 |
| | DVB | | | | | | 5 | 25 | 10 |
| | BVPE | | | | | | 25 | 5 | 10 |
| filler | C1 | | 100 | 100 | 130 | 50 | 100 | 100 | 20 |
| | C2 | | | | | | | | 10 |
| | C3 | | | | | | | | 20 |
| | C6 | | | | | | | | 60 |
| | C9 | 100 | | | | | | | |
| polyolefin | B-3000 | | 5 | 15 | | | | | 10 |
| | G1726 | | 5 | 10 | | | | | 15 |
| | SBS-C | | 3 | 10 | | | | | 8 |
| second curing accelerator | 25B | 0.5 | 0.5 | 0.5 | 0.5 | 0.5 | 0.5 | 0.5 | 0.6 |
| third solvent | toluene | PA | PA | PA | PA | PA | PA | PA | PA |

| Property | Unit | E9 | E10 | E11 | E12 | E13 | E14 | E15 | E16 |
|---|---|---|---|---|---|---|---|---|---|
| prepreg appearance | / | OK | OK | OK | OK | OK | OK | OK | OK |
| P/S | lb/inch | 4.4 | 4.2 | 4.3 | 4.1 | 4.6 | 4.2 | 4.3 | 4.7 |
| PCT | / | ○○○ | ○○○ | ○○○ | ○○○ | ○○○ | ○○○ | ○○○ | ○○○ |
| water absorption rate | % | 0.25 | 0.18 | 0.15 | 0.23 | 0.22 | 0.15 | 0.16 | 0.14 |
| Df variation rate under moisture and heat | % | 29.5 | 24.5 | 15.6 | 32.3 | 27.6 | 20.1 | 19.2 | 14.5 |
| branch-like pattern on laminate | mm | N | N | N | N | N | N | N | N |

TABLE 3

Resin compositions of Comparative Examples CE1-CE5 (in part by weight) and test results of articles thereof

| Composition | | CE1 | CE2 | CE3 | CE4 | CE5 |
|---|---|---|---|---|---|---|
| unsaturated C═C double bond-containing polyphenylene ether resin | SA9000 | 100 | 100 | 100 | 100 | 100 |
| | OPE-2st 1200 | | | | | |
| | OPE-2st 2200 | | | | | |
| unsaturated C═C double bond-containing crosslinking agent | TAIC | 25 | 25 | 25 | 25 | 25 |
| | DVB | | | | | |
| | BVPE | | | | | |
| other filler | X1 | 100 | | | | |
| | X2 | | 100 | | | |
| | C1-1 | | | 10 | 10 | |
| | C1-2 | | | 90 | | |
| | C3-2 | | | | 90 | 90 |
| | iM30K | | | | | 10 |
| | SC2500 | | | | | |
| second curing accelerator | 25B | 0.5 | 0.5 | 0.5 | 0.5 | 0.5 |
| third solvent | toluene | PA | PA | PA | PA | PA |

| Property | Unit | CE1 | CE2 | CE3 | CE4 | CE5 |
|---|---|---|---|---|---|---|
| prepreg appearance | / | NG | NG | NG | NG | NG |
| P/S | lb/inch | 3.1 | 3.3 | 3.5 | 3.2 | 3.2 |
| PCT | / | XXX | ○XX | ○XX | ○○X | XXX |
| water absorption rate | % | 0.58 | 0.41 | 0.37 | 0.28 | 0.55 |
| Df variation rate under moisture and heat | % | 60.7 | 59.1 | 57.4 | 41.5 | 68.9 |
| branch-like pattern on laminate | mm | 7 | 2 | 3 | 1 | 7 |

TABLE 4

Resin compositions of Comparative Examples CE6-CE10 (in part by weight) and test results of articles thereof

| Composition | | CE6 | CE7 | CE8 | CE9 | CE10 |
|---|---|---|---|---|---|---|
| unsaturated C═C double bond-containing polyphenylene ether resin | SA9000 | 100 | 100 | 100 | 100 | 100 |
| | OPE-2st 1200 | | | | | |
| | OPE-2st 2200 | | | | | |
| unsaturated C═C double bond-containing crosslinking agent | TAIC | 25 | 25 | 25 | 25 | 25 |
| | DVB | | | | | |
| | BVPE | | | | | |
| other filler | C1-1 | 10 | | | | |
| | C1-2 | | | | | |
| | C3-2 | | | | | |
| | iM30K | | 10 | 10 | 10 | 10 |
| | SC2500 | 90 | 90 | 90 | 90 | 90 |
| silane coupling agent | KBM-503 | | | 0.15 | | |
| | KBM-403 | | | | 0.15 | |
| | KBM-903 | | | | 0.90 | |
| | KBM-802 | | | 0.90 | | 0.15 |
| | KBM-103 | | | | | 0.90 |
| second curing accelerator | 25B | 0.5 | 0.5 | 0.5 | 0.5 | 0.5 |
| third solvent | toluene | PA | PA | PA | PA | PA |

| Property | Unit | CE6 | CE7 | CE8 | CE9 | CE10 |
|---|---|---|---|---|---|---|
| prepreg appearance | / | NG | NG | NG | NG | NG |
| P/S | lb/inch | 3.6 | 2.6 | 2.9 | 3.1 | 3.0 |
| PCT | / | ○XX | XXX | XXX | XXX | XXX |
| water absorption rate | % | 0.32 | 0.51 | 0.60 | 0.63 | 0.61 |
| Df variation rate under moisture and heat | % | 42.2 | 68.4 | 70.9 | 75.2 | 71.1 |
| branch-like pattern on laminate | mm | 4 | 7 | 7 | 7 | 7 |

The following observations can be made from Table 1 to Table 4.

The comparison of Example E1 using the filler C1 with the Comparative Example CE1 using the filler X1 and the Comparative Example CE2 using the filler X2, as illustrated in FIG. 2, FIG. 3 and FIG. 4, it can be observed that the hollow filler of the filler C1 is connected with more non-hollow fillers on the surface, the hollow filler of the filler X1 is connected with fewer non-hollow fillers on the surface, and the hollow filler of the filler X2 is barely connected with any non-hollow filler on the surface. The property tests show that Example E1, in contrast with Comparative Example CE1 and Comparative Example CE2, has excellent thermal resistance after moisture absorption, low Df variation rate under moisture and heat, low water absorption rate, high copper foil peeling strength, the prepreg having a smooth appearance and even color, and absence of branch-like pattern on laminate.

Examples E1 to E16 using the fillers C1 to C9, compared with Comparative Example CE3 containing the fillers C1-1 and C1-2, Comparative Example CE4 containing the fillers C1-1 and C3-2, Comparative Example CE5 containing the fillers iM30K and C3-2, and Comparative Example CE6 containing the fillers C1-1 and SC2500, as shown in the test results above, can achieve at the same time excellent thermal resistance after moisture absorption, low Df variation rate under moisture and heat, low water absorption rate, high copper foil peeling strength, the prepreg having a smooth appearance and even color, and absence of branch-like pattern on laminate.

Example E1 containing the filler C1, compared with Comparative Example CE7 containing surface-untreated hollow filler and surface-untreated non-hollow filler and Comparative Examples CE8 to CE10 respectively containing surface-untreated hollow filler, surface-untreated non-hollow filler and different silane coupling agents, as shown in the test results above, can achieve excellent thermal resistance after moisture absorption, low Df variation rate under moisture and heat, low water absorption rate, high copper foil peeling strength, the prepreg having a smooth appearance and even color, and absence of branch-like pattern on laminate.

The above detailed description is merely illustrative in nature and is not intended to limit the embodiments of the subject matter or the applications and uses of such embodiments. As used herein, the term "exemplary" or similar expression means "serving as an example, instance, or illustration." Any implementation described herein as exemplary is not necessarily to be construed as preferred or advantageous over other implementations, unless otherwise specified.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments and equivalents thereof. Also, the scope defined by the claims includes known equivalents and foreseeable equivalents at the time of filing this patent application.

What is claimed is:

1. A filler comprising a first precursor and a second precursor, wherein:
   the first precursor is a hollow filler with a surface covered by a first silane coupling agent;
   the second precursor is a non-hollow filler with a surface covered by a second silane coupling agent; and
   the first precursor and the second precursor are connected by a covalent bond formed by a chemical reaction between the first silane coupling agent and the second silane coupling agent; and wherein:
   the hollow filler comprises spherical hollow glass or spherical hollow silica, and the non-hollow filler comprises spherical non-hollow silica;
   the spherical hollow glass comprises 70-80 wt % of silica, 3-8 wt % of sodium oxide, 8-15 wt % of calcium oxide and 2-6 wt % of boron trioxide; and
   a weight ratio of the first precursor to the second precursor is from 3:97 to 25:75.

2. The filler of claim 1, wherein the hollow filler has a maximum particle size of less than or equal to 100 µm, and the non-hollow filler has a maximum particle size of less than or equal to 15 µm.

3. The filler of claim 1, wherein the first silane coupling agent and the second silane coupling agent are independently a C═C double bond-containing, an epoxy-containing, a mercapto-containing or an amino-containing silane coupling agent or a combination thereof.

4. The filler of claim 1, wherein the amount of the first silane coupling agent is 0.5% to 5% by weight of the hollow filler, and the amount of the second silane coupling agent is 0.5% to 5% by weight of the non-hollow filler.

5. A method of preparing the filler of claim 1, comprising the following steps:
   preparing the first precursor: stirring the hollow filler in an alkaline solution to obtain a surface-hydroxylated hollow filler; stirring the surface-hydroxylated hollow filler and the first silane coupling agent in a first solvent to obtain the first precursor, the first precursor being the hollow filler with a surface covered by the first silane coupling agent;
   preparing the second precursor: stirring the non-hollow filler in the alkaline solution to obtain a surface-hydroxylated non-hollow filler; stirring the surface-hydroxylated non-hollow filler and the second silane coupling agent in the first solvent to obtain the second precursor, the second precursor being the non-hollow filler with a surface covered by the second silane coupling agent;
   chemically connecting the first precursor and the second precursor: well mixing the first precursor and the second precursor in a second solvent and, in the presence of a first curing accelerator, subjecting the first precursor and the second precursor to the chemical reaction via the first silane coupling agent and the second silane coupling agent so as to form the covalent bond therebetween to obtain the filler.

6. The method of claim 5, wherein:
   the first silane coupling agent and the second silane coupling agent are independently a C═C double bond-containing, an epoxy-containing, a mercapto-containing or an amino-containing silane coupling agent or a combination thereof; and/or
   in the step of chemically connecting the first precursor and the second precursor, a weight ratio of the first precursor to the second precursor is controlled to be from 3:97 to 25:75; and/or
   the alkaline solution comprises a sodium hydroxide solution, a potassium hydroxide solution, triethylamine or potassium tert-butoxide; and/or
   the first solvent comprises water, methanol, ethanol, ethylene glycol monomethyl ether, acetone, butanone, methyl isobutyl ketone, cyclohexanone, toluene, xylene, methoxyethyl acetate, ethoxyethyl acetate, propoxyethyl acetate, ethyl acetate, propylene glycol methyl ether, dimethyl formamide, dimethyl acetamide, N-methyl-pyrrolidone, or a mixture thereof; and/or the second solvent comprises methanol, ethanol, ethylene glycol monomethyl ether, acetone, butanone, methyl isobutyl ketone, cyclohexanone, toluene, xylene, methoxyethyl acetate, ethoxyethyl acetate, propoxyethyl acetate, ethyl acetate, propylene glycol methyl ether, dimethyl formamide, dimethyl acetamide, N-methyl-pyrrolidone, or a mixture thereof; and/or the first curing accelerator comprises a Lewis base, a curing initiator or a combination thereof; and/or the step of preparing the first precursor and the step of preparing the second precursor are performed at a temperature of 20° C. to 60° C. respectively and with 1 to 8 hours of stirring respectively; and/or the step of chemically connecting the first precursor and the second precursor is performed at a temperature of 60° C. to 120° C. and with 1 to 6 hours of the chemical reaction.

7. A resin composition, comprising:
(A) 100 parts by weight of an unsaturated C=C double bond-containing polyphenylene ether resin;
(B) 5 parts by weight to 40 parts by weight of an unsaturated C=C double bond-containing crosslinking agent; and
(C) 50 parts by weight to 130 parts by weight of the filler of claim 1; wherein:
the unsaturated C=C double bond-containing polyphenylene ether resin comprises a vinylbenzyl polyphenylene ether resin, a (meth)acryloyl polyphenylene ether resin, a vinyl polyphenylene ether resin or a combination thereof; and
the unsaturated C=C double bond-containing crosslinking agent comprises bis(vinylphenyl)ethane, bis(vinylbenzyl)ether, divinylbenzene, divinylnaphthalene, divinylbiphenyl, triallyl isocyanurate, triallyl cyanurate, 1,2,4-trivinyl cyclohexane, butadiene, decadiene, octadiene or a combination thereof.

8. The resin composition of claim 7, further comprising, based on 100 parts by weight of the unsaturated C=C double bond-containing polyphenylene ether resin, 13 parts by weight to 35 parts by weight of a polyolefin which comprises polybutadiene, polyisoprene, styrene-butadiene copolymer, styrene-isoprene copolymer, styrene-butadiene-divinylbenzene terpolymer, styrene-butadiene-maleic anhydride terpolymer, vinyl-polybutadiene-urethane oligomer, maleic anhydride-butadiene copolymer, polymethylstyrene, hydrogenated polybutadiene, hydrogenated styrene-butadiene-divinylbenzene terpolymer, hydrogenated styrene-butadiene-maleic anhydride terpolymer, hydrogenated styrene-butadiene copolymer, hydrogenated styrene-isoprene copolymer or a combination thereof.

9. The resin composition of claim 7, further comprising maleimide resin, benzoxazine resin, epoxy resin, organic silicone resin, cyanate ester resin, active ester, phenolic resin, styrene maleic anhydride, amine curing agent, polyamide, polyimide or a combination thereof.

10. The resin composition of claim 7, further comprising a flame retardant, a second curing accelerator, a polymerization inhibitor, a third solvent, a third silane coupling agent, a surfactant, a coloring agent, a toughening agent or a combination thereof.

11. An article made from the resin composition of claim 7, wherein the article comprises a prepreg, a resin film, a laminate, or a printed circuit board.

12. The article of claim 11, which is a prepreg having a smooth appearance and even color under visual inspection.

13. The article of claim 11, having a copper foil peeling strength as measured by reference to IPC-TM-650 2.4.8 of greater than or equal to 3.8 lb/inch.

14. The article of claim 11, wherein no delamination occurs after subjecting the article to a thermal resistance after moisture absorption test by reference to IPC-TM-650 2.6.16.1 and IPC-TM-650 2.4.23.

15. The article of claim 11, having a water absorption rate as measured by reference to IPC-TM-650 2.6.2.1 of less than or equal to 0.27%.

16. The article of claim 11, having a dissipation factor variation rate under moisture and heat of less than or equal to 34.7% as calculated according to a dissipation factor measured at room temperature and a dissipation factor measured after the article is placed under a temperature of 85° C. and a relative humidity of 85% for 48 hours, both being measured by reference to JIS C2565 at 10 GHz.

17. The article of claim 11, being without branch-like pattern under visual inspection.

18. A filler comprising a first precursor and a second precursor, wherein:
the first precursor is a hollow filler with a surface covered by a first silane coupling agent;
the second precursor is a non-hollow filler with a surface covered by a second silane coupling agent; and
the first precursor and the second precursor are connected by a covalent bond formed by a chemical reaction between the first silane coupling agent and the second silane coupling agent; and wherein:
the hollow filler comprises spherical hollow glass or spherical hollow silica, and the non-hollow filler comprises spherical non-hollow silica; and
the spherical hollow glass comprises 70-80 wt % of silica, 3-8 wt % of sodium oxide, 8-15 wt % of calcium oxide and 2-6 wt % of boron trioxide.

19. A resin composition, comprising:
(A) 100 parts by weight of an unsaturated C=C double bond-containing polyphenylene ether resin;
(B) 5 parts by weight to 40 parts by weight of an unsaturated C=C double bond-containing crosslinking agent; and
(C) 50 parts by weight to 130 parts by weight of the filler of claim 18; wherein:
the unsaturated C=C double bond-containing polyphenylene ether resin comprises a vinylbenzyl polyphenylene ether resin, a (meth)acryloyl polyphenylene ether resin, a vinyl polyphenylene ether resin or a combination thereof; and
the unsaturated C=C double bond-containing crosslinking agent comprises bis(vinylphenyl)ethane, bis(vinylbenzyl)ether, divinylbenzene, divinylnaphthalene, divinylbiphenyl, triallyl isocyanurate, triallyl cyanurate, 1,2,4-trivinyl cyclohexane, butadiene, decadiene, octadiene or a combination thereof.

* * * * *